(12) United States Patent
McCaffrey

(10) Patent No.: US 7,584,164 B2
(45) Date of Patent: Sep. 1, 2009

(54) USER INTERFACE METHOD AND APPARATUS

(75) Inventor: David Charles McCaffrey, Liverpool (GB)

(73) Assignee: Knowledge Support Systems limited, Manchester (GB)

(*) Notice: Subject to any disclaimer, the term of this patent is extended or adjusted under 35 U.S.C. 154(b) by 0 days.

(21) Appl. No.: 11/242,135

(22) Filed: Oct. 4, 2005

(65) Prior Publication Data

US 2007/0094220 A1   Apr. 26, 2007

(30) Foreign Application Priority Data

Oct. 1, 2005 (GB) .................... 0520024.1

(51) Int. Cl.
*G06N 5/00* (2006.01)
(52) U.S. Cl. .......................... 706/52; 706/45
(58) Field of Classification Search ............ 706/12, 706/35, 45, 52
See application file for complete search history.

(56) References Cited

U.S. PATENT DOCUMENTS

| | | | |
|---|---|---|---|
| 5,874,955 A * | 2/1999 | Rogowitz et al. ........... 345/589 |
| 2002/0046198 A1 * | 4/2002 | Hitt ........................... 706/20 |
| 2003/0110043 A1 * | 6/2003 | Morrison et al. ............. 705/1 |
| 2003/0131315 A1 * | 7/2003 | Escher ........................ 715/512 |
| 2003/0149603 A1 * | 8/2003 | Ferguson et al. ............. 705/7 |
| 2004/0172372 A1 * | 9/2004 | Wells et al. ................. 705/400 |
| 2005/0209944 A1 * | 9/2005 | Ballow et al. ............... 705/35 |
| 2006/0166643 A1 * | 7/2006 | Puthenpura et al. ......... 455/406 |

OTHER PUBLICATIONS

"Gas Prices: How are they really set?", Report prepared by the Majority staff of the Permanent Subcommittee on Investigations, See Section V pp. 283-284. Available at http://www.senate.gov/~gov_affairs/042902gasreport.htm Apr. 29, 2002.
Search Report issued in corresponding priority British application No. GB0520024.1 (Dec. 21, 2006).

* cited by examiner

*Primary Examiner*—Wilbert L Starks, Jr.
(74) *Attorney, Agent, or Firm*—Nixon & Vanderhye P.C.

(57) ABSTRACT

A computer implemented method for displaying values for an output variable comprising displaying a first user interface element configured to present values of a first input variable; displaying a second user interface element configured to present values of a second input variable; displaying a third user interface element configured to present values of an output variable, the output variable varying in dependence upon the first and second input variables; receiving first user input of a value for the first variable via the first user interface element; receiving second user input of a value for the second variable via the second user interface element; and updating the third user interface element to indicate at least one value of the output variable in response to the first user input and the second user input.

27 Claims, 32 Drawing Sheets

|  | Predicted Change | Δ |
|--|--|--|
|  |  |  |

|  | $\Delta_1$ | ... | $\Delta_i$ | ... | $\Delta_n$ |
|--|--|--|--|--|--|
| Prediction$_1$ |  |  |  |  |  |
| ⋮ |  |  |  |  |  |
| Prediction$_M$ |  |  |  |  |  |

FIG 24A

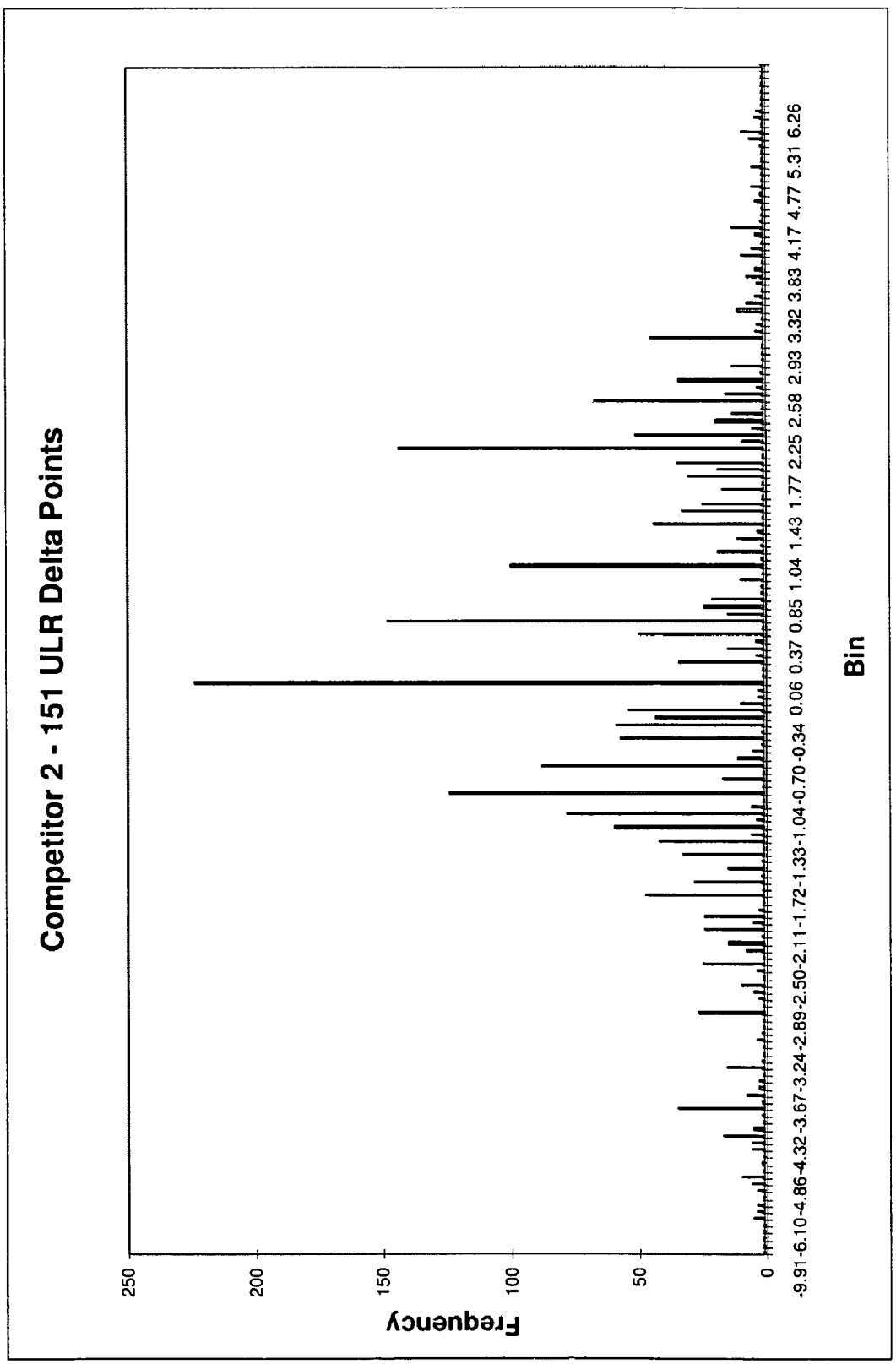

USER INTERFACE METHOD AND APPARATUS

This application claims priority to GB0520024.1 filed 1 Oct. 2005, the entire contents of which are hereby incorporated by reference.

The present invention relates to a computer implemented method for displaying values for an output variable. The invention also relates to a method for configuring a rule, the rule being configured to process input data and to generate output data. The invention additionally relates to a method of generating a price estimate.

In many industries, commercial organisations have to determine prices at which their products are to be sold. Determination of such prices will need to take into account various factors. For example, a particular commercial organisation may wish to ensure that its prices are within a predetermined limit of a particular competitors prices. Similarly, a commercial organisation may wish to ensure that a particular constraint is applied such that prices of different products sold by that organisation have a predetermined relationship with one another.

A particular industry in which prices need to be determined is the wholesale fuel industry. In particular, it is necessary to determine so called "rack prices" at which fuel is to be sold at oil terminals. It is at this stage that ownership of oil is transferred from a wholesaler to secondary distributors. Accordingly, the rack price is the price paid by the secondary distributors to the wholesaler. The rack price charged by a particular wholesaler, will be determined by a number of different parameters. For example, prices charged by the wholesaler's competitors are likely to need to be taken into account, as are prices of various other products sold by that wholesaler. Typically, a plurality of wholesalers operate at a particular market or "rack" comprising a plurality of terminals, and prices charged by different operators at a particular rack will routinely need to be taken into account. Additionally, prices charged at different racks within a particular region may also need to be taken into account.

Traditionally, prices at which fuel wholesalers sell fuel have been determined by highly skilled pricing analysts who have mentally collated and processed data representing various parameters which need to be taken into account. Having carried out this processing, analysts can typically determine rack pricing, often convening at a meeting at which a plurality of pricing analysts make various strategy decisions.

Although such a mechanism for determining rack pricing has been used for a number of years, it has a number of disadvantages. For example the method requires that a large number of highly skilled pricing analysts are always available to make the necessary pricing decisions by mentally processing the necessary data. This problem is exasperated given that prices are usually determined on a day by day basis, and must be determined within a pricing window typically extending from lunch time to the end of a working day.

Additionally, although the method described above has been used for a number of years, it is difficult for pricing analysts to effectively take all necessary factors into account, and indeed the subjective assessment carried out by pricing analysts cannot be subjected to rigorous analysis. For example pricing analysts will often find it difficult to determine price strategies employed by competitors, these strategies being important so as to ensure that a price selected for a particular wholesalers products has a predetermined relationship with prices of competitor products.

It is an object of the present invention to obviate or mitigate at least some of the problems set out above.

According to the present invention, there is provided a computer implemented method for displaying values for an output variable, the method comprising, displaying a first user interface element configured to present values of a first input variable, displaying a second user interface element configured to present values of a second input variable, displaying a third user interface element configured to present values of an output variable, said output variable varying in dependence upon said first and second input variables, receiving first user input of a value for said first variable via said first user interface element, receiving second user input of a value for said second variable via said second user interface element, and updating said third user interface element to indicate at least one value of said output variable in response to said first user input and said second user input.

According to the present invention there is also provided a method for configuring a rule, said rule being configured to process input data to generate output data, the method comprising: identifying an object associated with said rule, said object defining at least one parameter for said rule, presenting a user interface configured to receive rule configuration input data, receiving configuration input data, and updating said at least one parameter of said object based upon said configuration input data, said updating causing configuration of said rule.

The invention also provides a method of generating a price estimate, the method comprising: generating a price prediction based upon first data, reading historical data based upon said price prediction, said historical data indicating historical price data related to said price prediction, and updating said price prediction in response to said historical data to generate said price estimate.

According to a further aspect of the present invention, there is provided a method of generating output data, the method comprising: storing a plurality of objects, each of said objects comprising at least one identification parameter identifying a property of data associated with a respective object, storing a rule configured to operate on input data to generate said output data, said rule identifying an object of said plurality of objects using at least one identification parameter, and executing said rule to generate said output data, wherein executing said rule comprises reading data associated with said identified object, and obtaining said input data using data associated with said identified object.

The invention also provides a computer-implemented method for generating wholesale oil price data, the method comprising: defining a plurality of rules configured to execute on input data to generate output data, said input data representing data affecting said wholesale oil prices, executing said rules to generate wholesale oil prices.

It will be appreciated that aspects of the invention can be implemented in a wide range of forms. Such forms include, but are not limited to methods, apparatus, systems, devices, computer programs, and suitable carrier media such as CD-ROMs, floppy disks, and communication lines.

Embodiments of the present invention will now be described, by way of example, with reference to the accompanying drawings, in which:

FIGS. 24 and 24A are screenshots taken from a data manipulation module provided by the present invention; and FIGS. 25 and 26 are graphs showing data manipulated by an embodiment of the present invention.

Figure 1:
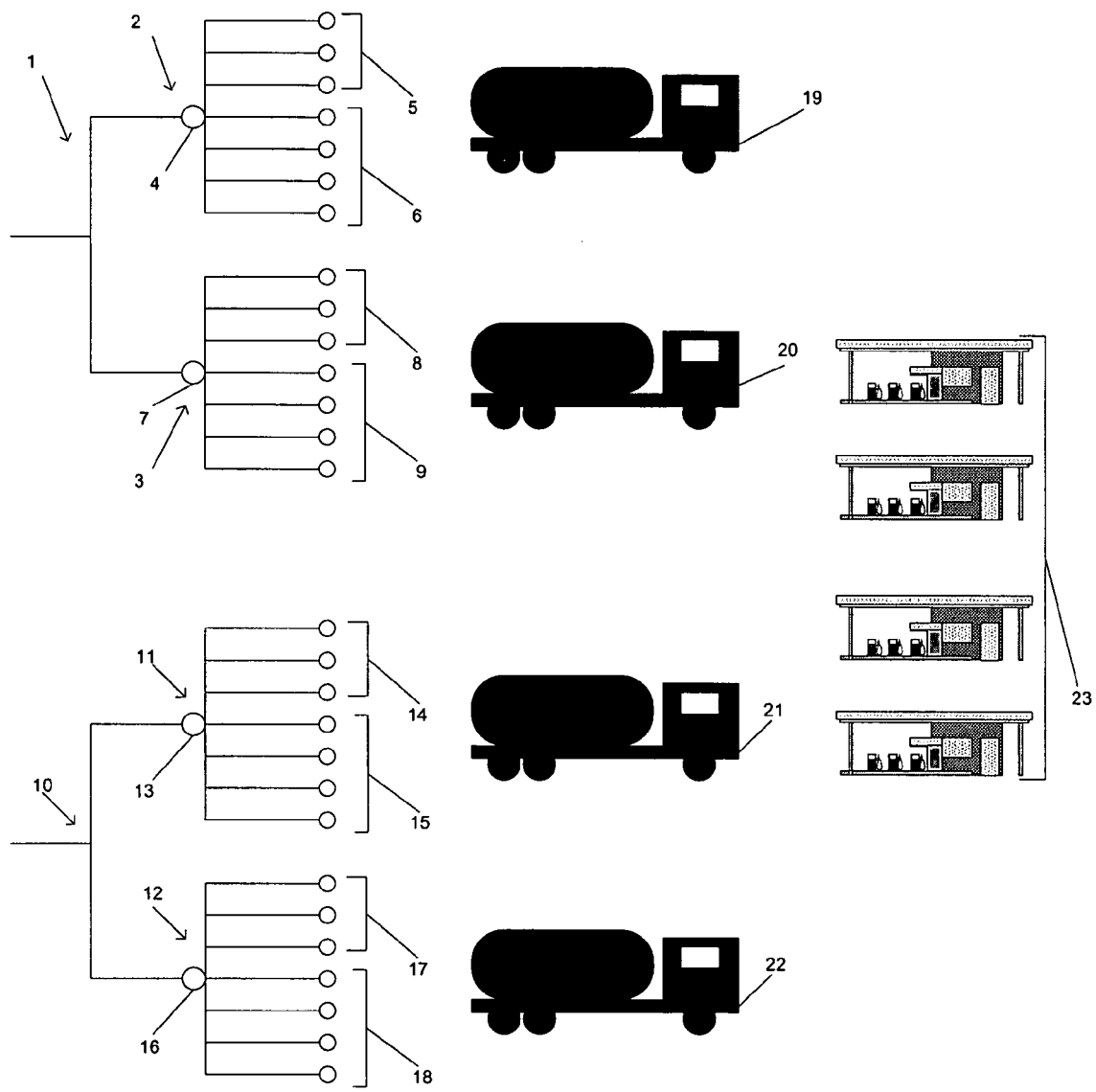
FIG. 1 is a schematic illustration of a fuel distribution scenario to which the present invention may be applied.

Referring first to FIG. 1, a fuel distribution infrastructure is illustrated. As is conventional, fuel is distributed from a market 1 at which two fuel wholesalers offer fuel for sale from respective terminals 2, 3. The fuel wholesaler operating the terminal 2 receives fuel and uses a process 4 to separate different fuel products including a gasoline product 5 and a distillate product 6 received from a pipeline. The gasoline product 5 comprises unleaded road fuel and comprises three grades of such fuel, namely regular, mid and premium. Again, the process 4 operates as a "switch" to ensure that different products are kept separate. In general terms, the process 4 is configured in accordance with fuel expected to be delivered through the pipeline at various times so as to route fuel into appropriate tanks. It should be noted that at "switch over" some fuel may be mixed, and such mixed fuel is discarded. The distillate product 6 has broad commercial use including in on road trucking, home heating, jet transportation and off road stationary applications such as agriculture. The distillate product 6 comprises four distinct products namely two low sulphur products, a jet transportation product and a high sulphur product. Again, these products are kept separate by the process 4. The fuel wholesaler 3 operating at the terminal 1 similarly operates a process 7 to keep different fuel products separate and again generates gasoline product 8 and distillate product 9.

At a geographically distinct location, a further market 10 operates. At this market, two fuel wholesalers offer fuel for sale from terminals 11, 12. The fuel wholesalers operating at the market 10 may be the same as or different from the fuel wholesalers operating at the market 1. The fuel wholesaler operating the terminal 11 again operates a process 13 to separate various gasoline products 14 and various distillate products 15. The fuel wholesaler operating the terminal 12 operates a process 16 to separate various gasoline products 17 and various distillate products 18.

The fuel wholesalers operating the terminals 2, 3, 11, 12 sell fuel to customers who typically take physical delivery of the fuel in road tankers. Customers of the fuel typically own a fleet of such tankers and/or a network of filling stations. Contracts between the fuel wholesalers operating the terminals 2, 3, 11, 12 and their customers can take a variety of forms. However, in general terms the contracts can either be such that the price paid by a customer is determined in advance or determined on a day to day basis. When prices are determined in advance, they are typically based upon a predetermined index linked either to previous prices or to spot fuel prices. Prices determined on a day to day basis are typically calculated by the fuel wholesalers operating the terminals 2, 3, 11, 12 on the basis of various factors.

As shown in FIG. 1, the customers typically operate fuel tankers 19, 20, 21, 22. As indicated above, operators of the fuel tankers 19, 20, 21, 22 may operate a fleet of filling stations such that, for example, the fuel tanker 19 may deliver fuel only to filling stations owned by its operator. However, in general terms the fuel tankers 19, 20, 21, 22 deliver fuel to filling stations 23 as well as other fuel consumers which are not shown.

As described above, fuel wholesalers need to determine prices at which fuel is to be sold. It is important that this process is carried out efficiently, given that processing must be carried out between generation of estimates at midday, and a deadline for posting prices for the next working day.

Figure 2:
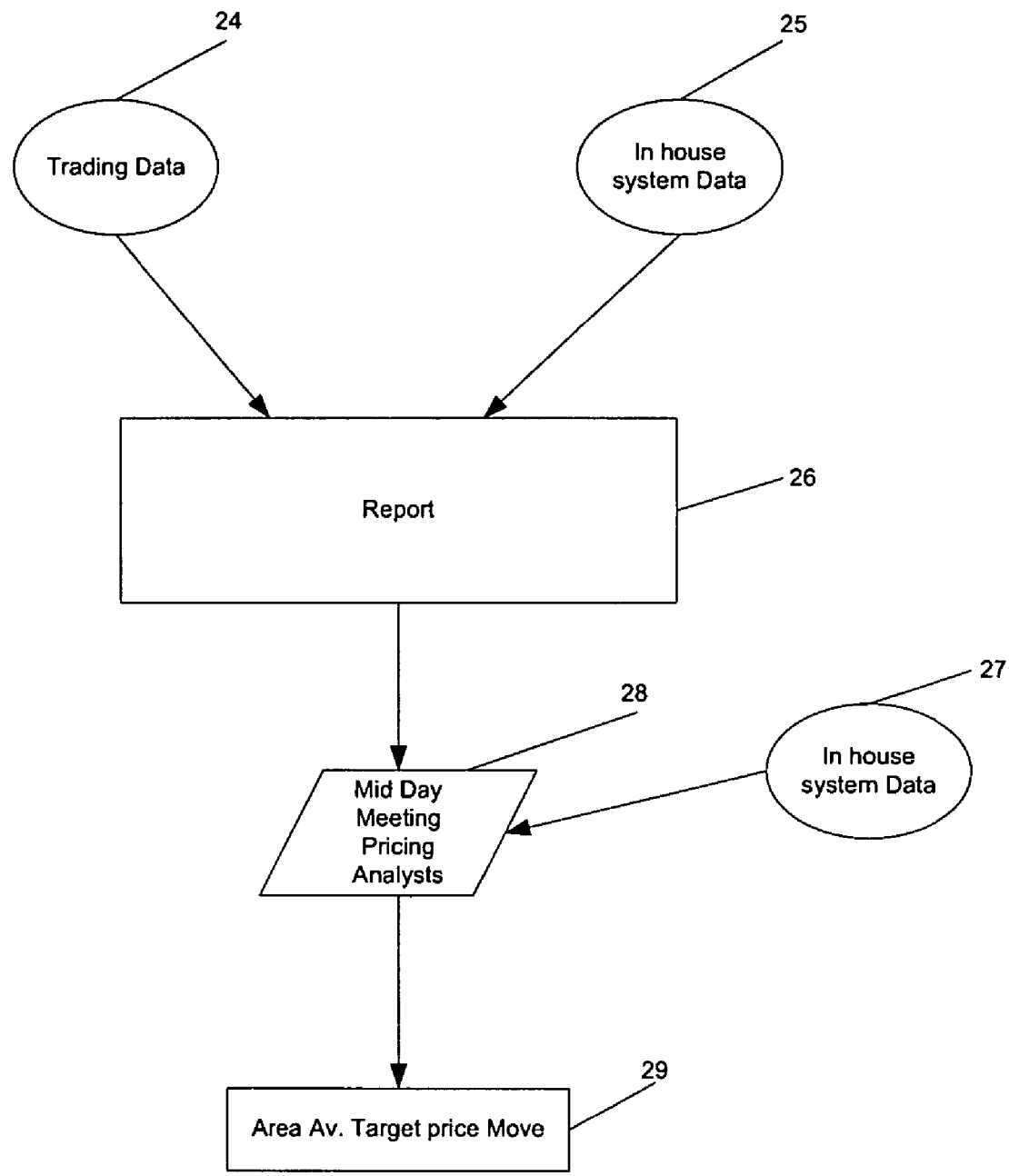
FIGS. 2 and 3 are schematic illustrations of prior art processes used to determine pricing at oil terminals shown in FIG. 1.
Figure 3:
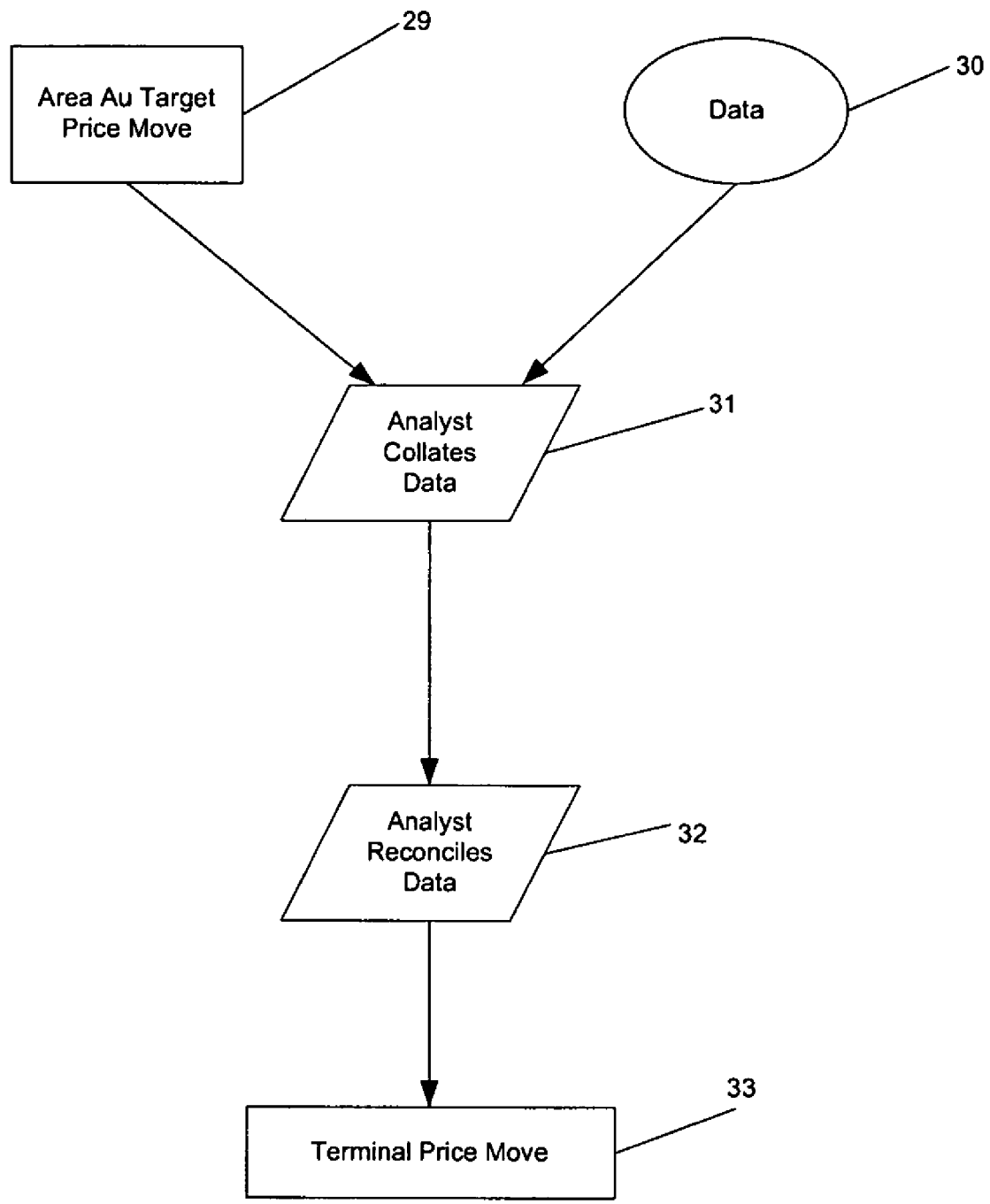

In one known system for determining prices, two complimentary processes are carried out. A first process shown in FIG. 2 is used to determine a pricing strategy for an area comprising a plurality of terminals operated by a particular wholesaler. A second process shown in FIG. 3 determines actual prices for a particular terminal within that area. That is, the process of FIG. 3 is carried out for each terminal within the area individually.

Referring first to FIG. 2, trading data 24 and data 25 taken from appropriate in house systems operated by the fuel wholesaler is processed to generate a report 26. This report brings together pertinent data to assist pricing analysts in making pricing decisions for a particular area. The report 26 is used together with further data 27 taken from in the house systems at a meeting of pricing analysts 28. This meeting generates an average target price move 29 which terminals within the area should seek to achieve.

In further detail, the trading data 24 is generated by traders and comprises actual midday spot price data, as well as estimates of closing spot price and spot price change as compared with the previous working day, the change computed on the basis of the estimate of closing spot price. The data 25 comprises various average data taken from across the area of interest. This data includes an average margin based upon the midday spot price, an average spread between branded and unbranded fuel price, as well as data comparing current prices with current competitor prices. Based upon the trading data 24 and the data 25, the report 26 comprises four major data items. These are an estimate in spot price variation as compared to the previous day, an estimated profit margin based upon the closing estimate of spot price, an average spread between branded and unbranded prices, and data indicating comparison with a competitor's prices.

As described, the report 26 is used alongside further data 27 at a meeting 28 in which skilled pricing analysts determine a desired average price move. The data 27 comprises data indicating area inventory issues, current large discounts which the wholesaler is offering, and any issues relating to the wholesaler's large customers.

Thus, it can be seen that to determine an area pricing strategy using the processing of FIG. 2 requires a meeting to be convened at which data is manually processed by skilled individuals.

Referring to FIG. 3, it can be seen that the data 29 generated by the meeting 28 of FIG. 2 is used to determine a price for a particular terminal. The data 29 is used alongside data 30 which indicates competitor price details. An analyst collates the data 29, the data 30 and various other strategic parameters which need to be taken into account (denoted 31 in FIG. 3). The collated information is then reconciled by the analyst (denoted 32) to generate price 33 data for a particular terminal.

Thus, it can be seen that using the prior art processes of FIGS. 2 and 3 price data for a particular terminal is generated. However, the generation of this data requires a meeting of skilled analysts, and considerable manual and mental data collation and reconciliation activities by analysts to determine the output price data 33.

Figure 4:
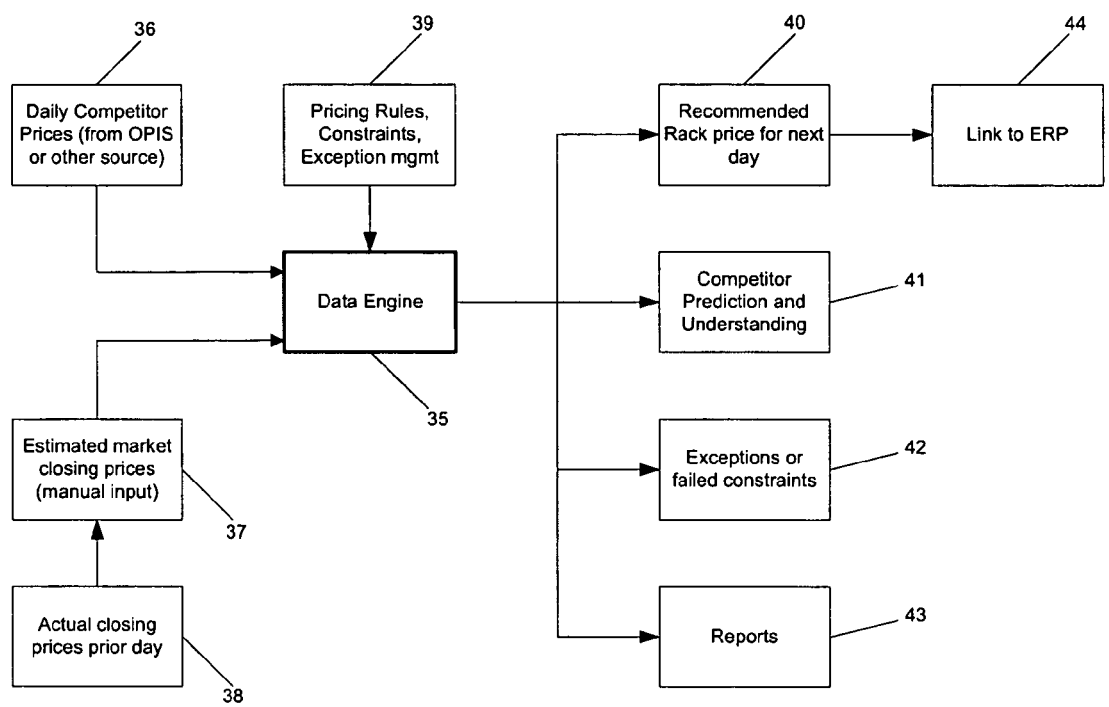
FIG. 4 is a schematic illustration of processing carried out by an embodiment of the invention.

Embodiments of the present invention are concerned with providing computer implemented methods for aiding operators of fuel terminals in making pricing decisions. FIG. 4 schematically illustrates high-level processing carried out by a computer in an embodiment of the present invention.

Referring to FIG. 4, it can be seen that a data engine 35 takes various data as input, and generates various data as output. Specifically, the engine 35 takes as input daily competitor price data 36 which, obtained from a commercial source, and estimated closing market prices 37 which are input manually or from an appropriate external system. As can be seen, the estimated closing market prices 37 are generated by an analyst on the basis of actual price data 38, indicating actual closing prices for the previous day. The data engine 35 makes use of predefined rules, constraints, and exception management 39 to use the described input data to generate output data. The output data comprises recommended price data 40, generated by the data engine 35 using pricing rules 39. Additionally, the data engine 35 provides output data 41 which can be used to predict competitor price changes, and to understand competitor pricing policies. Data 42 is generated indicating constraints which are specified by the data 39 but which are not satisfied by the recommended price 40. Reports 43 are also generated by the data engine 35.

It can further be seen that the recommended price data 40 is output to a module 44 which links to an Enterprise Resource Planning (ERP) system. Such systems provide various business management functions such as stock control, purchasing, and procurement functions. Suitable systems include SAP and JDE.

Having described high level processing carried out by an embodiment of the present invention, components used to implement the invention are now described with reference to FIG. 5. It can be seen that a rule engine 45 is provided which communicates with other components and processes various data. As is described in further detail below, the rule engine applies rules to input data to generate output data. Indeed, it can be seen that rule engine 45 receives data from a price data source 46, which is provided in an appropriately formatted file 47 specified in the extensible markup language (XML). The rule engine 45 also receives data from a volume data source 48 in the form of an appropriate XML file 49. The rule engine 45 outputs generated data to an ERP system 50 in a file 51 adhering to a predetermined file format. The rule engine 45 also communicates with a database 52 which stores pertinent data. The database 52 in turn communicates with a data warehouse 53 storing data input to and generated by the rule engine 45. Data is passed been the database 52 and the data warehouse in the form of appropriate files 54.

The rule engine 45 is configured so as to allow access from computers connected to a computer network. Therefore, the rule engine 45 is connected to a webserver 55, which in turn communicates with an appropriate client web browser 56. In this way, a user of the client web browser 56 can use an API 57 provided the rule engine 45 to modify and interrogate rules used by the rule engine 45. This is described in further detail below. The client web browser 56 can also access the Data warehouse 53

Figure 6:
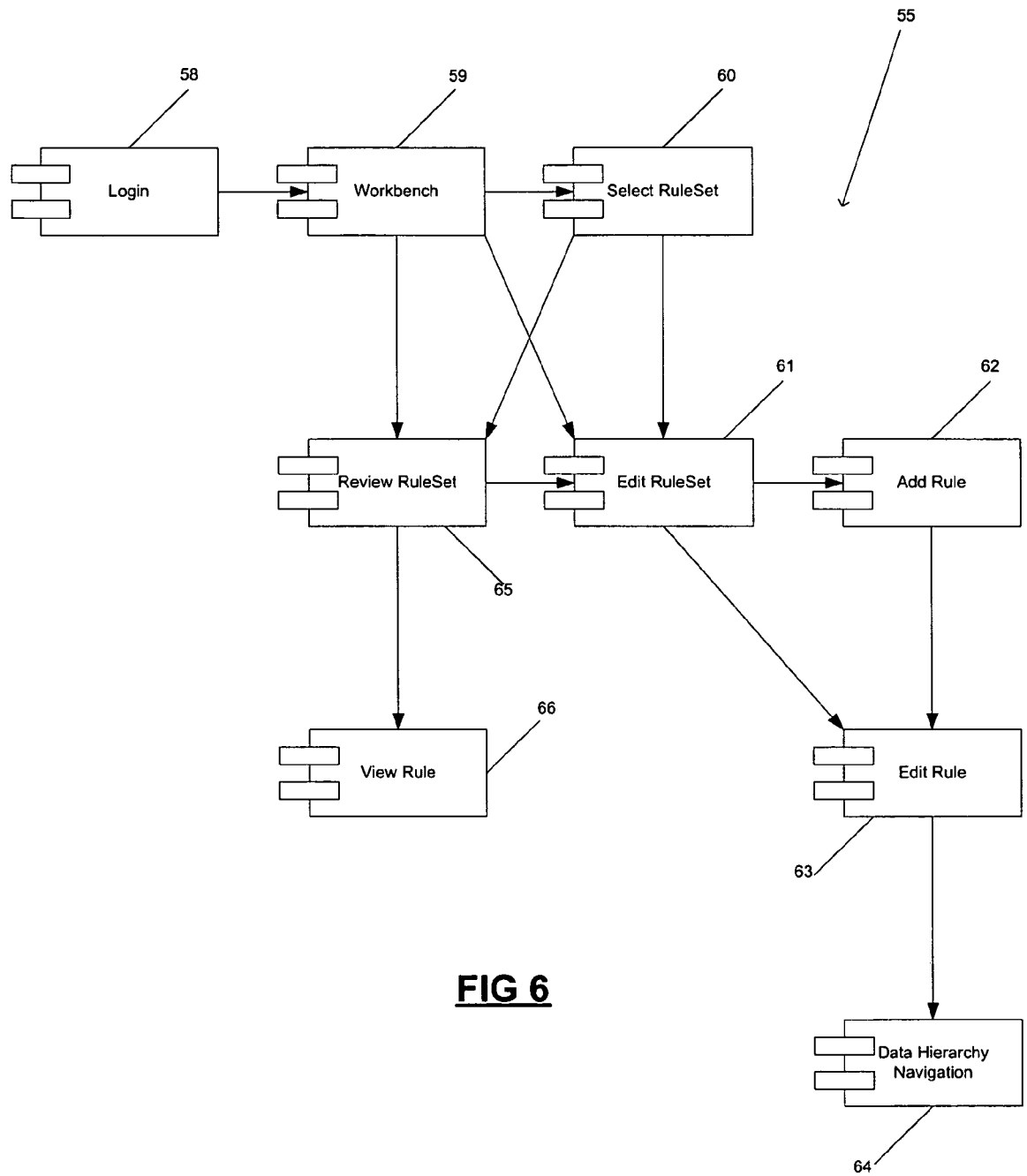
FIG. 6 is a schematic illustration showing components making up the web server of FIG. 5.

Referring now to FIG. 6, software components of the web server 55 used to enable review and editing of rules are shown at a high level. A login component 58 provides user authentication functionality. A workbench component 59 provides various user-selectable functionality. From the workbench component 59 a user can use a selection component 60 to select a rule set, and from the selection component 60, a rule set can be edited using a edit component 61. From the edit component 61, an add component 62 can be used to add a rule to the edited rule set. From either the edit component 61 or the add component 62 a component 63 can be used to edit a selected rule. The editing process may also involve navigation of an appropriate data hierarchy using a navigation component 64. From either the workbench component 59 or the selection component 60, a review component 65 can be selected to review a rule set. From the review component 65, the edit component 61 can be used to edit a rule set as described above. Additionally, from the review component 65 a view component 66 can be used to view a rile of the rule set of interest.

Thus, from the description of FIG. 6, it can be seen that the web server 55 provides various components which allow a rule set associated with the rule engine 45 to be viewed, configured and edited by a user.

Figure 5:
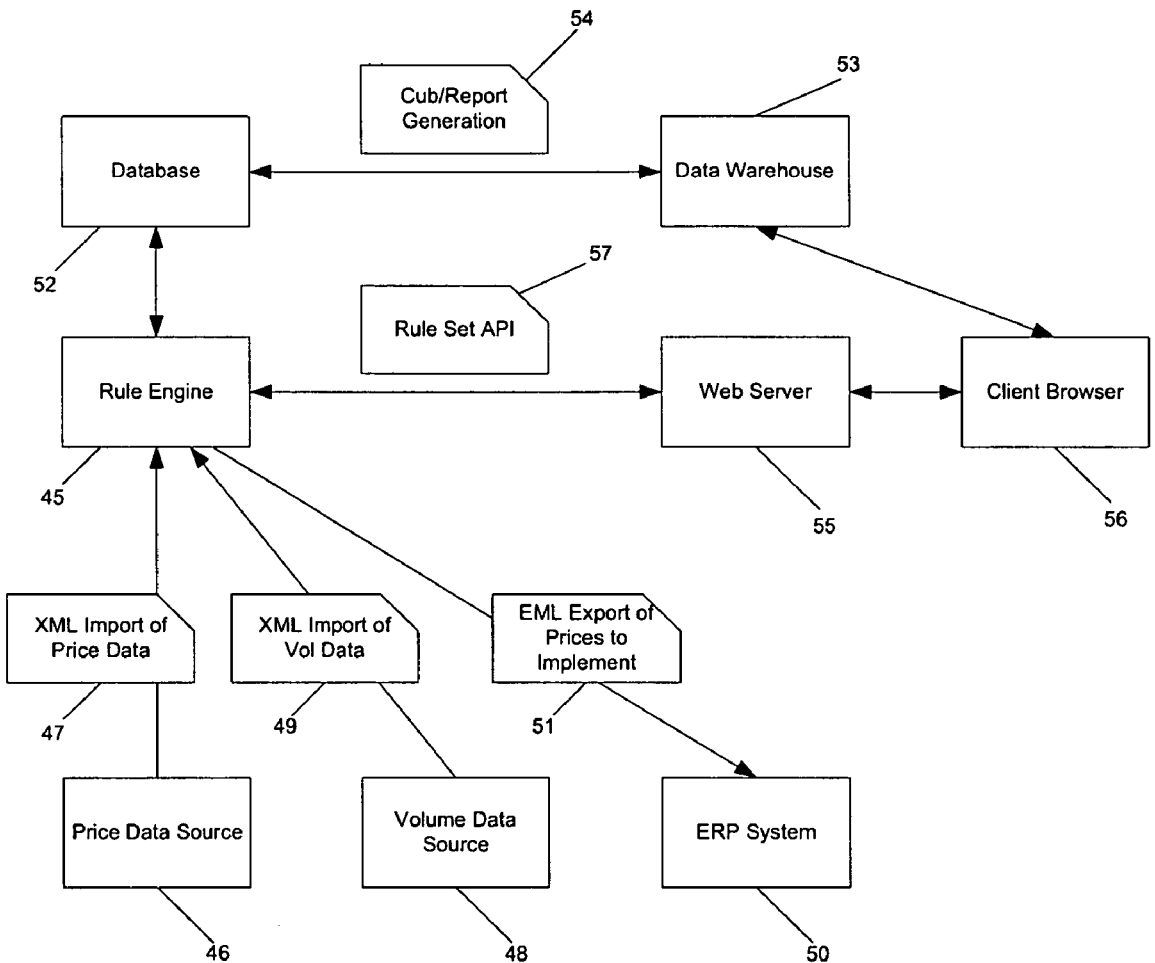
FIG. 5 is a schematic illustration of components used to implement the embodiment of the present invention shown in FIG. 4.
Figure 7:
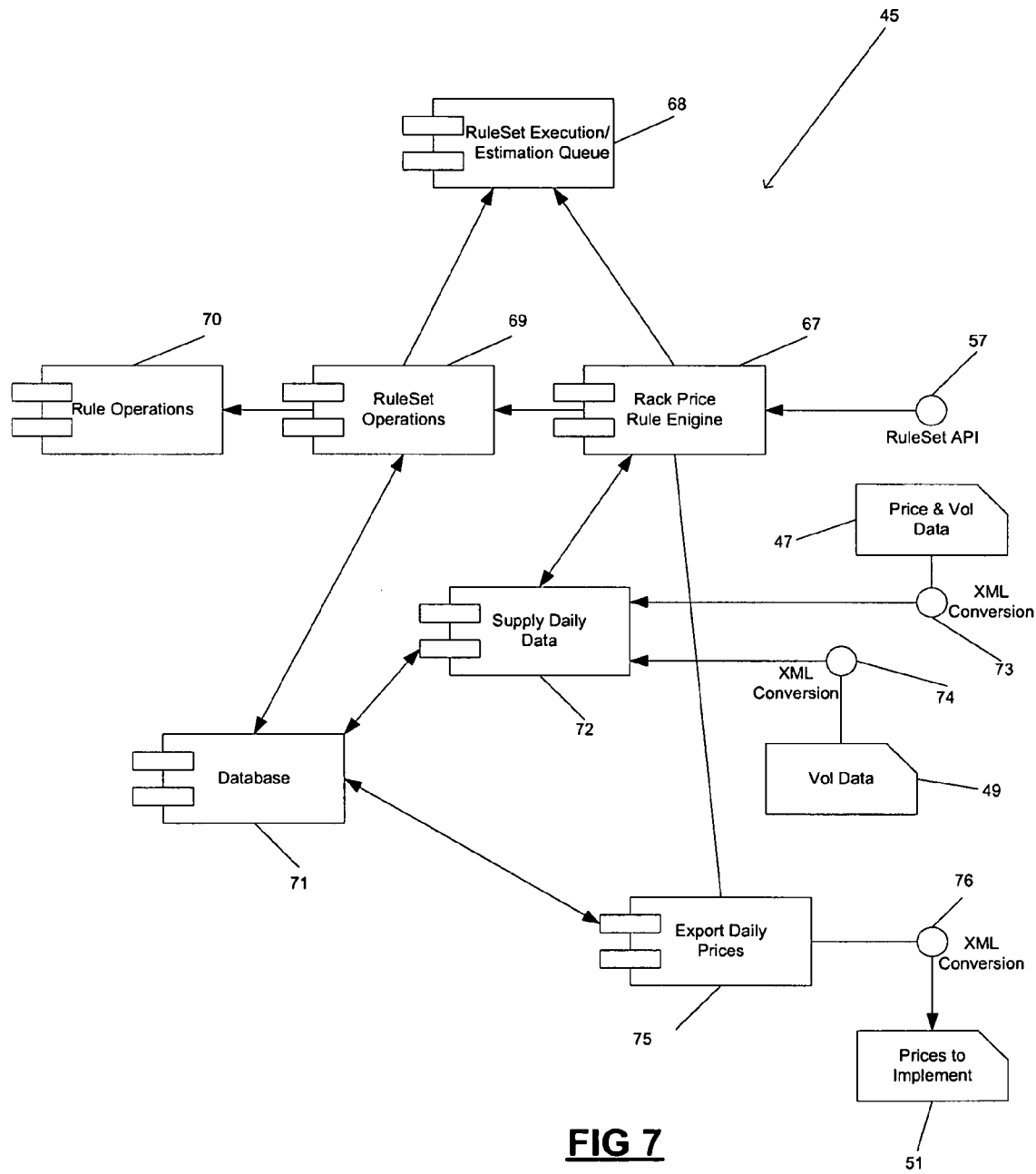
FIG. 7 is a schematic illustration showing components making up the Rule Engine of FIG. 5.

FIG. 7 shows software components used to implement the rule engine 45 of FIG. 5. It can be seen that the rule set API 57 described with reference to FIG. 5 communicates with a rule engine component 67. The API 57 provides an interface between the web server 55 and components of the rule engine 48 described below. In all cases, calls are made to functions provided by the API 57 and these calls are passed to the rule engine components 67. The rule engine component in turn communicates with various components of the rule engine 45. In particular, the rule engine component 67 communicates with an execution component 68 which is configured to apply particular rules of particular rule sets to input data so as to generate output data. Additionally, the rule engine component 67 communicates with a rule set operations component 69. The rule set operations component 69 is configured to carry out various review and modification operations on rule sets. It can be seen that the rule set operations component 69 itself communicates with the execution components 68. The rule set operations component 69 also communicates with a rule operations component 70 which is configured to carry out review and modification operations on individual rules of individual rule sets. That is, while the rules set operations component 69 is concerned with operating on a set of rules, operations on rules within rule sets are carried out by the rule operations component 70.

It will be appreciated that in order to carry out operations on particular rule sets, the rule set operations component 69 needs to access the database 52 shown in FIG. 5. This is achieved by the use of a database helper component 71 which provides methods to allow communication between the rule set operations component 69 and the database 52. Additionally, the rule engine component 67 communicates with a supply daily data component 72. The supply daily data component 72 is configured to receive input data and provide that data to the database 52. More specifically, price data 47 is received in XML format, and converted into an internal format by means of an XML conversion component 73. The converted data is then provided to the supply daily data component 72, from where it is passed to the database helper component 71, and in turn to the database 52. Similarly, volume data 49 is received by the rule engine 45 in XML format, and converted into an internal format by means of an XML conversion component 74. The received data is then provided to the supply daily data component 72 from where it is provided to the database helper component 71, before being passed to the database 52. Having described the manner in which data input to the rules engine is handled, it will be appreciated that it is similarly necessary to handle data to be output from the rule engine, in particular the price data 51 (FIG. 5). It can be seen that the rule engine component 67 communicates with an export daily prices component 75. When data is to be exported, the rule engine 67 communicates with the export daily prices component 75, which in turn retrieves appropriate data from the database 52 making use of the database helper component 71. Having retrieved appropriate data from the database 57, the export daily prices component 75 passes this data to an XML conversion component 76. The XML conversion component 76 is configured to convert data received in an internal format into an XML format of predetermined structure. In this way, the XML conversion component 76 converts the data received from the export daily prices component 75 into the output price data 51 in XML form.

Figure 8:
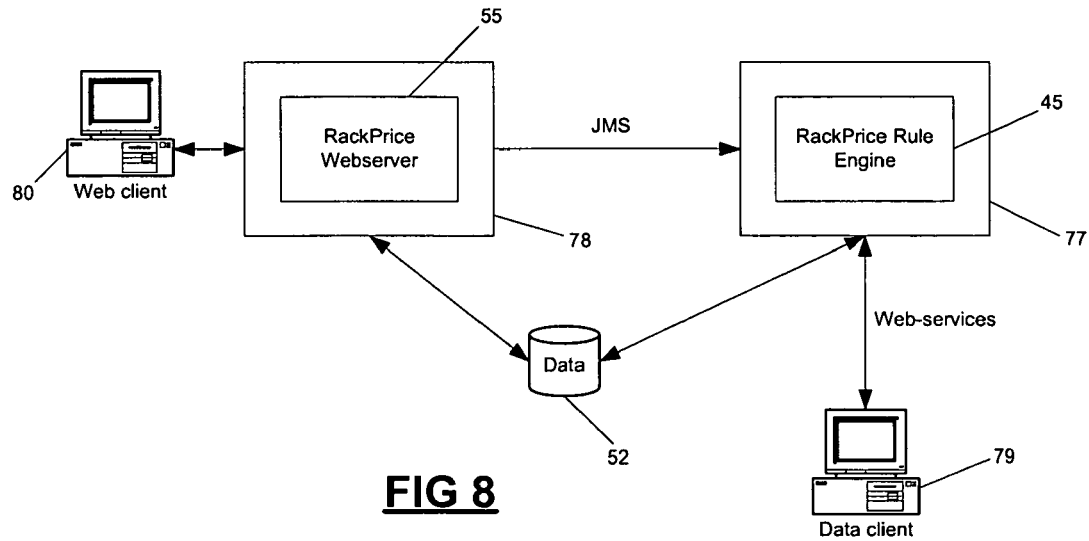
FIG. 8 is a schematic illustration of an architecture used to implement the present invention.

Having described logical components of an embodiment of the invention, and having described logical components of the rule engine and the web server in further detail, a distributed architecture for implementing described embodiments of the invention is now described with reference to FIGS. 8 and 9. Referring first to FIG. 8, it can be seen that the rule engine 45 runs on a rule engine server 77, while the web server 55 runs on a web server 78. As described above, the web server and rule engine communicate with one another. In a preferred embodiment of the present invention, the Java programming language and associated libraries are used to implement the invention and the Java messaging system (JMS) is used to enable communication between the web server 55 and the rule engine 45. Both the web server 55 and the rule engine 45 make use of the database 52, and accordingly the rule engine server 77 and the web server 78 are provided with communications links to the database 52. Additionally, the rule engine server 77 communicates with a data client 79 which is configured to provide data to and receive data from the rule engine 45. Communication between the data client 79 and the rule engine 45 is achieved by the rule engine 45 exposing web services which the data client uses for communication. This is described in further detail below. Additionally, as described above, a web based interface to the rule engine 45 is provided using the web server component 55 operating on the web server 78. In this way, a web client 80 can view pages provided by the web server component 55 so as to access the rule engine 45. The web client 80 can therefore interrogate and modify rule sets associated with the rule engine 45.

Figure 9:
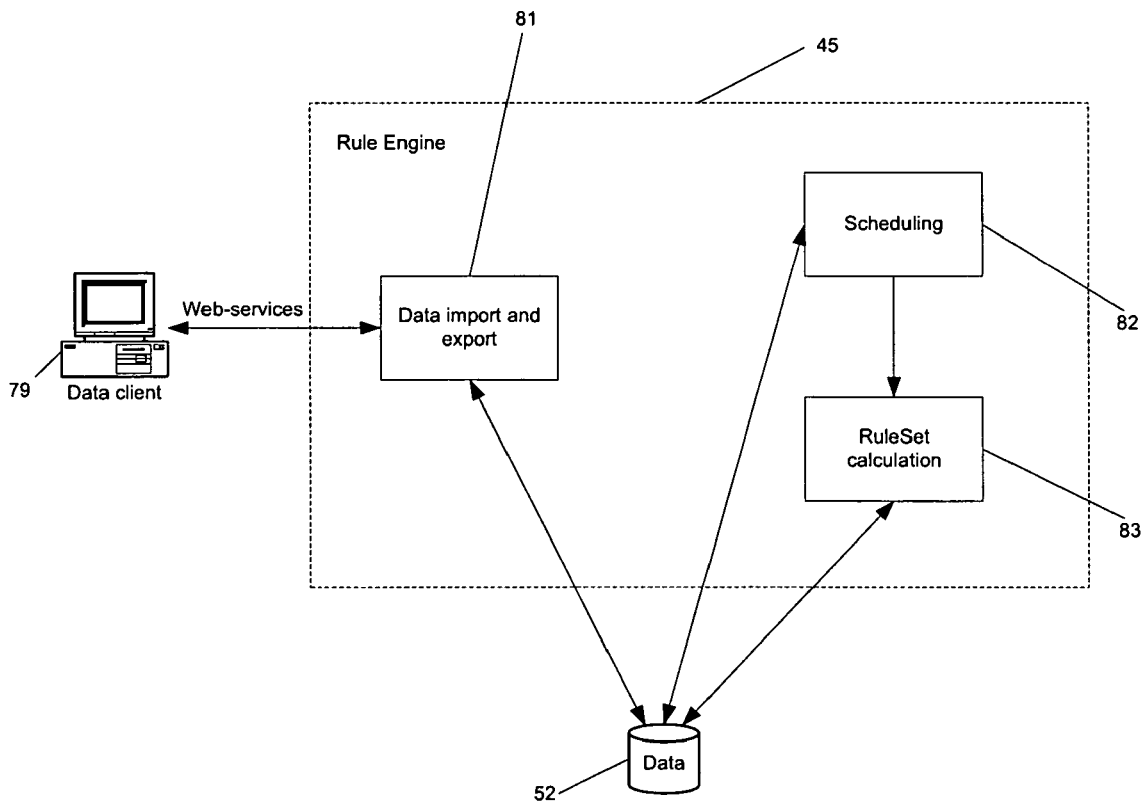
FIG. 9 is a schematic illustration showing an architecture for the Rule Engine of FIG. 8.
Figure 10A:
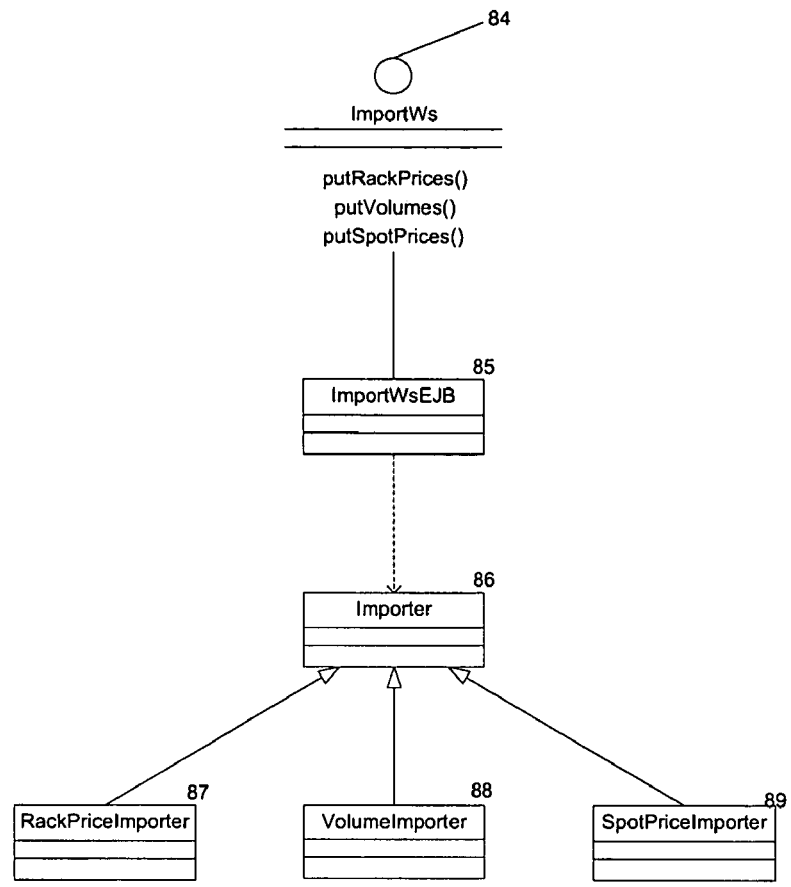
FIGS. 10A and 10B are class diagrams showing web services exposed by the Rule Engine of FIG. 9 to allow data import and export.
Figure 10B:
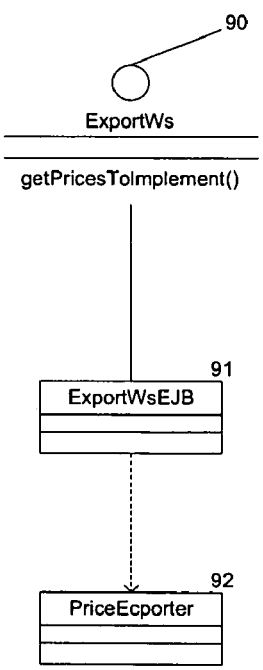

FIG. 9 shows groups of components of the rule engine 45 in further detail, and it is with reference to these components that the embodiment is described in further detail below. Referring to FIG. 9 it can be seen that the data client 79 communicates with data import and export components 81 which are provided by the rule engine 45. The rule engine also provides scheduling components 82 and rule set calculation component 83. Both the data import and export components 81, the scheduling components 82, and the rule set calculation component 83 communicate with the database 52. As indicated above, communication between the data client 79 and the data import and export components 81 is carried out using web services provided by the data import and export component. FIGS. 10A and 10B show classes configured to implement these web services.

Referring first to FIG. 10A, an import web service 84 provides three methods. These methods can be called from the data client 79 so as to cause data to be imported to the rule engine 45. Specifically, the import web service 84 provides a putRackPrices( ) method, a putVolumes( ) method, and a putSpotPrices( ) method. These methods are provided by an ImportWsEJB class 85. When one of these methods is called, an appropriate call is made to an instance of an Importer class 86. The Importer class 86 itself has three sub classes, and calls made from methods within the ImportEsEJB class 85 in fact target methods of the sub classes.

The Importer class 86 has as a sub class a RackPriceImporter class 87. Functionality provided by the RackPriceImporter class 87 is used when the putRackPrices( ) method provided by the import web service 84 is called. A VolumeImporter class 38 is also a subclass of the Importer class 86. Functionality provided by the VolumeImporter class 88 is used when the putVolumes( ) method provided by the import web service 84 is used. A SpotPriceImporter class 89 is also a subclass of the Importer class 86. The SpotPriceImporter class 89 is used in response to a call to the putSpotPrices( ) method provided by the import web service 84.

Thus, from FIG. 10A and the descriptions set out above it can be seen that the import web service 84 exposes three methods provided by the ImportWsEJB class 85.

In response to calls being made to one or these methods an appropriate instance of a subclass of the Importer class 86 is used. It should be noted that the methods provided by the import web service 84 allow appropriate XML data to be imported into the rule engine 45. More particularly, the putRackPrices( ) method allows an XML file containing a current day's actual rack prices, a previous day's actual spot prices, and a previous day's actual crude prices to be imported. This data corresponds to the XML file 47 of FIG. 5. The putVolumes( ) method enables an XML file containing a previous day's actual volumes to be imported. This XML data corresponds to the XML file 49 of FIG. 5. The putSpotPrices( ) method enables estimated spot prices and estimated crude prices to be imported by way of an appropriate XML file.

It should be noted that each of the three methods provided by the import web service 84 have restrictions upon their use. In particular, the methods can only be called within a particular time window each day. This ensures that in operation, prices are fixed at times as specified by appropriate regulations. Additionally, the methods will only process an XML file having a time stamp that is the current day's date, and will only process XML files conforming to a particular schema.

Having described the import web service 84 exposed by the rule engine 45, an export web service 90 exposed by the rule engine 45 is now described with reference to FIG. 10B. The export web service 90 exposes a single getPricesToImplement( ) method. This method may be called from the data client 79 so as to obtain price data calculated by the rule engine 45. The getPricesToImplement( ) method is provided by an ExportWsEJB class 91, and makes use of a PriceExporter class 92 which provides functionality required to obtain the necessary price data. It should be noted that the getPricesToImplement( ) method is restricted such that it may only be called during a fixed time each day, again so as to comply with appropriate regulatory requirements.

Referring back to FIG. 9, operation of the scheduling components 82 is now described with reference to FIGS. 11 to 14. In general, there are two types of operation which need to be scheduled by the rule engine. A first type of operation relates to operations performed after data has imported to the rule engine. These operations are scheduled to occur when the window for relevant input closes. Data validation rule sets are scheduled to execute at the end of the time window for external systems to import price data via the import web service 84 described above. Demand estimation rule sets are scheduled to execute at the end of the time window for external systems to import actual volume data, again using the import web service 84. Price generation rule sets are also scheduled to execute at the end of the time window for external systems to import today's estimated spot prices, again, using the import web service 34.

A second type of operation is performed before data can be exported from the rule engine. These operations must be scheduled to occur when the window for relevant export opens. These operations comprise preparing calculated price data for output via the export web service 90.

The scheduling operations described above are carried out using two timed stateless session Enterprise Java Beans (EJBs). An import EJB schedules the first type of operations described above, while an export EJB schedules the second type of operations described above. Java classes associated with the ImportEJB and the ExportEJB are now described in further detail.

Figure 11:
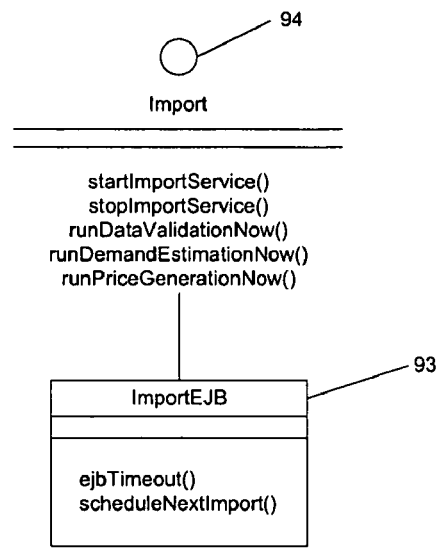
FIG. 11 is a schematic illustration showing a webservice exposed by the Rule Engine of FIG. 9 to allow import scheduling.

Referring now to FIG. 11, a class diagram for the import EJB is illustrated. It can be seen that an ImportEJB class 93 is provided, and that an import scheduler web service 94 provides an interface to the ImportEJB class 93. The import scheduler web service 94 exposes five methods. Although it will be appreciated that different numbers of methods may be exposed in alternative embodiments of the invention. StartImportScrive( ) and stopImportService( ) methods respectively start and stop scheduling associated with import operations. A runDataValidationNow( ) method causes data vailidation rules to be applied to received data at the time at which the method is called. Similarly, a runDemandEstimationNow( ) method causes demand estimation rule sets to be applied to received data at the time of the function call. A runPriceGenerationNow( ) method similarly applies price generation rule sets to the received data. The ImportEJB class further provides a ejbTimeout( ) method and a scheduleNextImport( ) method.

Operation of the import scheduler web service 94 and the associated ImportEJB class 93 is now described with reference to FIG. 12. It can be seen that a Client object 95 associated with a data client 79 (FIG. 9) makes a call to the startImportService( ) method provided by an Import object 96 which is an instance of the ImportEJB class 93. Upon receiving the startImportService( ) method call, the Import object 96 starts a timer 97. It should be noted that the timer 97 is not an object in its own right, rather a timer associated with the Enterprise Java Bean. The timer 97 causes a call to be made to the ejbTimeout( ) method of the Import object 96 after a predetermined time has elapsed. It should be noted that the ejbTimeout( ) method is called when the timer 97 times out, and the timeout associated with the timer 97 is set by the Import object 96. After the call to the ejbTimeout( ) method is received by the Import object 96 any data processing operations which are required are carried out. This may include data merge and other data processing operations. A JMS message is then sent to a message queue 98. This message queue is monitored by rule sets which are to execute in response to the ejbTimeout( ). Thus, the message being sent to the message queue 98 causes appropriate rule sets to execute. Having transmitted the message to the message queue 98, the Import object 96 calls its scheduleNextImport( ) method. At a time determined by the scheduleNextImport( ) method an appropriate call is to the startTimer( ) method which results in a call being made to the ejbTimeout( ) method as described above. A further message is then transmitted to the message queue 98, again as described above. Thus, the call to the startImportService( ) method causes the Import object 96 to schedule appropriate processing, by appropriately configuring the timeout of the timer 97.

Figure 12:
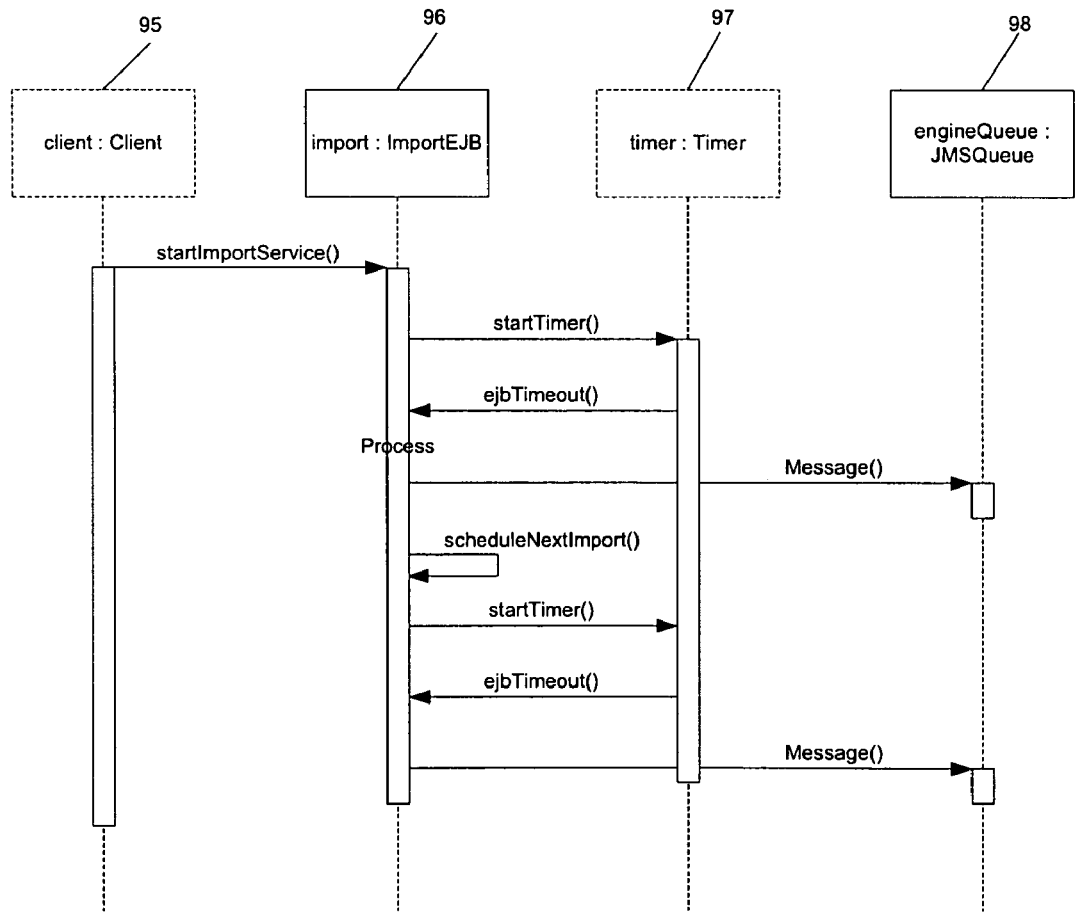
FIG. 12 is a sequence diagram showing operation of the class shown in FIG. 11.

In addition to the methods described above, it has been indicated that the import scheduler web service 94 exposes a stopImportService( ) method which terminates the processing illustrated in FIG. 12.

With regard to other methods exposed by the import scheduler web service 94, the runDataValidationNow( ) method creates a timer with an immediate timeout so as to cause an appropriate message to be sent to the message queue 98 immediately, thereby causing data validation rules to be applied. Similarly, the runDemandEstimationNow( ) method and runPriceGenerationNow( ) method similarly causes a timer to be created with an immediate timeout so as to cause the respective rule sets to be applied immediately. It should be noted that although the processing caused by the runDataValidationNow( ), runDemandEstimationNow( ) and runPriceGenerationNow( ) methods is similar to that shown in FIG. 12, these methods do not cause a call to be made to the scheduleNextImport( ) method as described above.

It was described above that the scheduler components 82 shown in FIG. 9 also included components configured to schedule export operations. Components configured to provide such scheduling are now described with reference to FIGS. 13 and 14.

Figure 13:
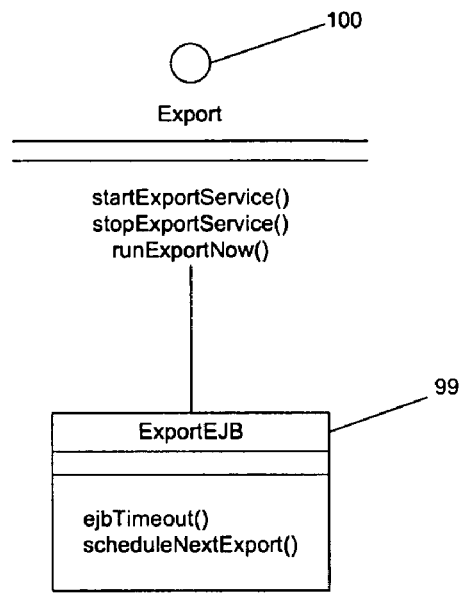
FIG. 13 is a class diagram showing a webservice exposed by the Rule Engine of FIG. 9 to allow export scheduling.

Referring to FIG. 13, an ExportEJB class 99 provides an export scheduler web service 100. The export scheduler web service 100 provides a startExportService( ) method, a stopExportService( ) method and a runExportNow( ) method. These methods are described in further detail below. The ExportEJB class 99 additionally provides a ejbTimeout( ) method, and a scheduleNextExport( ) method.

Figure 14:
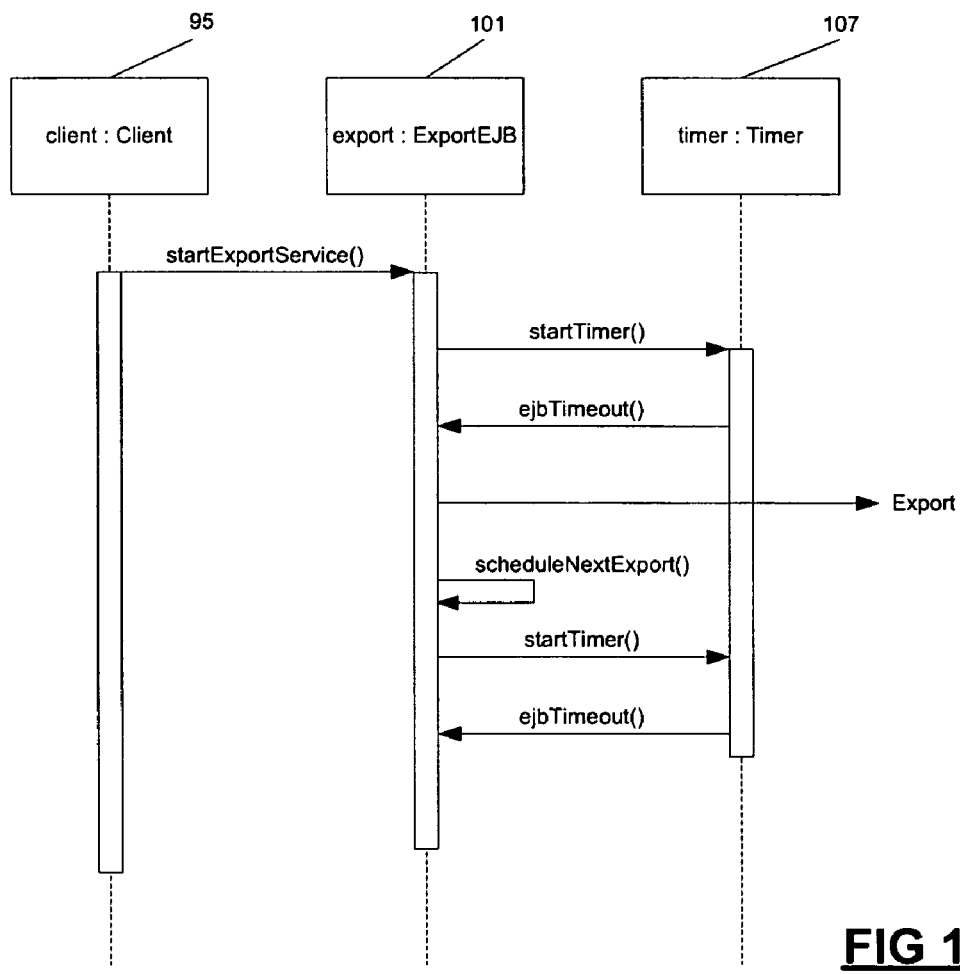
FIG. 14 is a sequence diagram showing operation of the class shown in FIG. 13 in further detail.

FIG. 14 shows operations associated with export scheduling. It can be seen that the Client object 95 in this case calls the startExportService( ) method provided by an Export object 101, the Export object 101 being an instance of the ExportEJB class 99. When the startExportService( ) method is called, the Export object 101 calls a startTimer( ) method associated with a timer 102. The startTimer( ) method configures a timer having a predetermined timeout, and after expiry of this time, the ejbTimeout( ) method associated with the Export object 101 is called. It should be noted that the startTimer( ) method is called so as to configure a timer which times out when the export operation to be scheduled is to take place. Therefore, after the call to the ejbTimeout( ) method, the Export object 101 performs the required export operation. Thereafter, the scheduleNextExport( ) method is called so as to configure the time at which export operations should next take place. Having determined when export operations should next take place, the scheduleNextExport( ) method calls the startTimer( ) method associated with the timer 102, and the timer 102 in turn calls the ejbTimeout( ) method at the appropriate time. Thus, the timer 102 is configured so as to cause export operations to be carried out again after a predetermined time.

As was described above, the export web service 100 also provides a stopExportervice( ) method which terminates processing of the type shown in FIG. 14. Additionally, a runExportNow( ) method causes a timer to be created with a zero timeout. This causes the cjbTimout( ) method to be called immediately, so as to cause export operations to be carried out upon the call to the runExportNow( ) method. Again, it should be noted that a call to the runExportNow( ) method does not cause scheduling, so that no further exports are scheduled.

Figure 15:
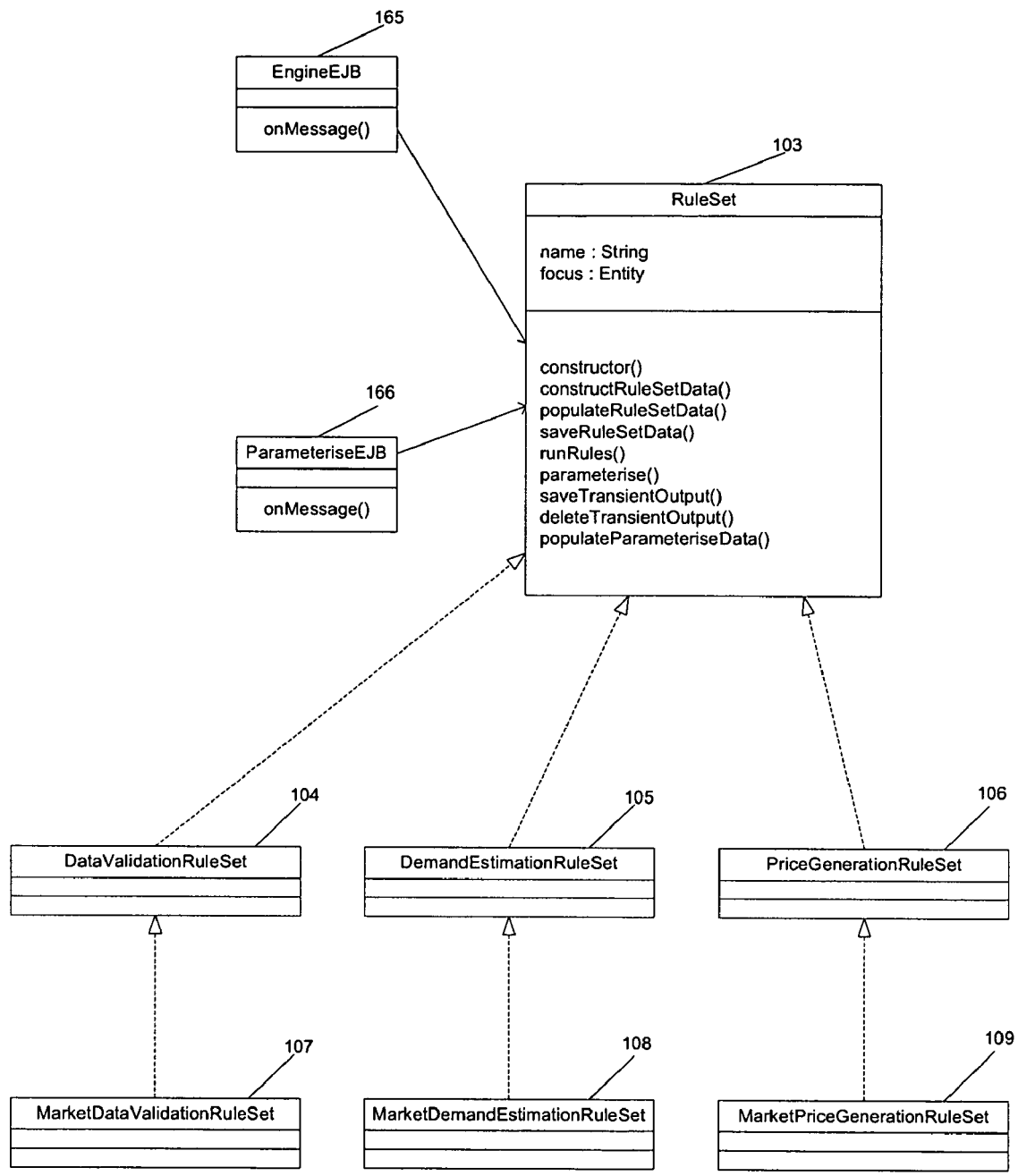
FIG. 15 is a class diagram showing a hierarchy of classes used to implement a rule set in the Rule Engine of FIG. 9.

Classes and interfaces used to implement rules used in embodiments of the present invention are now described with reference to FIGS. 15 to 20. Referring first to FIG. 15, it can be seen that a Rule set interface 103 is used to represent a set of rules used in embodiments of the invention. A rule set encapsulates a set of rules, together with data which those rules consume and produce. Advantages obtained by associating rules with data are described below. It can be seen from FIG. 15 that there are three types of rule set, each represented by a respective interface which is a subinterface of the rule set interface 103. Specifically, a DataValidationRuleSet interface 104 represents sets of rules intended to carry out validation on incoming data. A DemandEstimationRuleSet interface 105 is used to represent sets of rules which are intended to estimate elasticity and predict volumes. A PriceGenerationRuleSet interface 106 is used to represent rule sets which are intended to predict prices and prices which are to be implemented. It can be seen that the DataValidationRuleSet interface 104 is implemented by a MarketDataValidationRuleSet class 107. Similarly, the DemandEstimationRuleSet interface 105 is implemented by a MarketDemandEsitmationRuleSet class 108 and the PriceGenerationRuleSet interface 106 is implemented by a MarketPriceGenerationRuleSet class 109. The MarketDataValidationRuleSet class 107, the MarketDemandEstimationRuleSet 108, and the MarketPriceGenerationRuleSet class 109 are used to represent concrete implementations of rule sets used in embodiments of the present invention.

Figure 16:
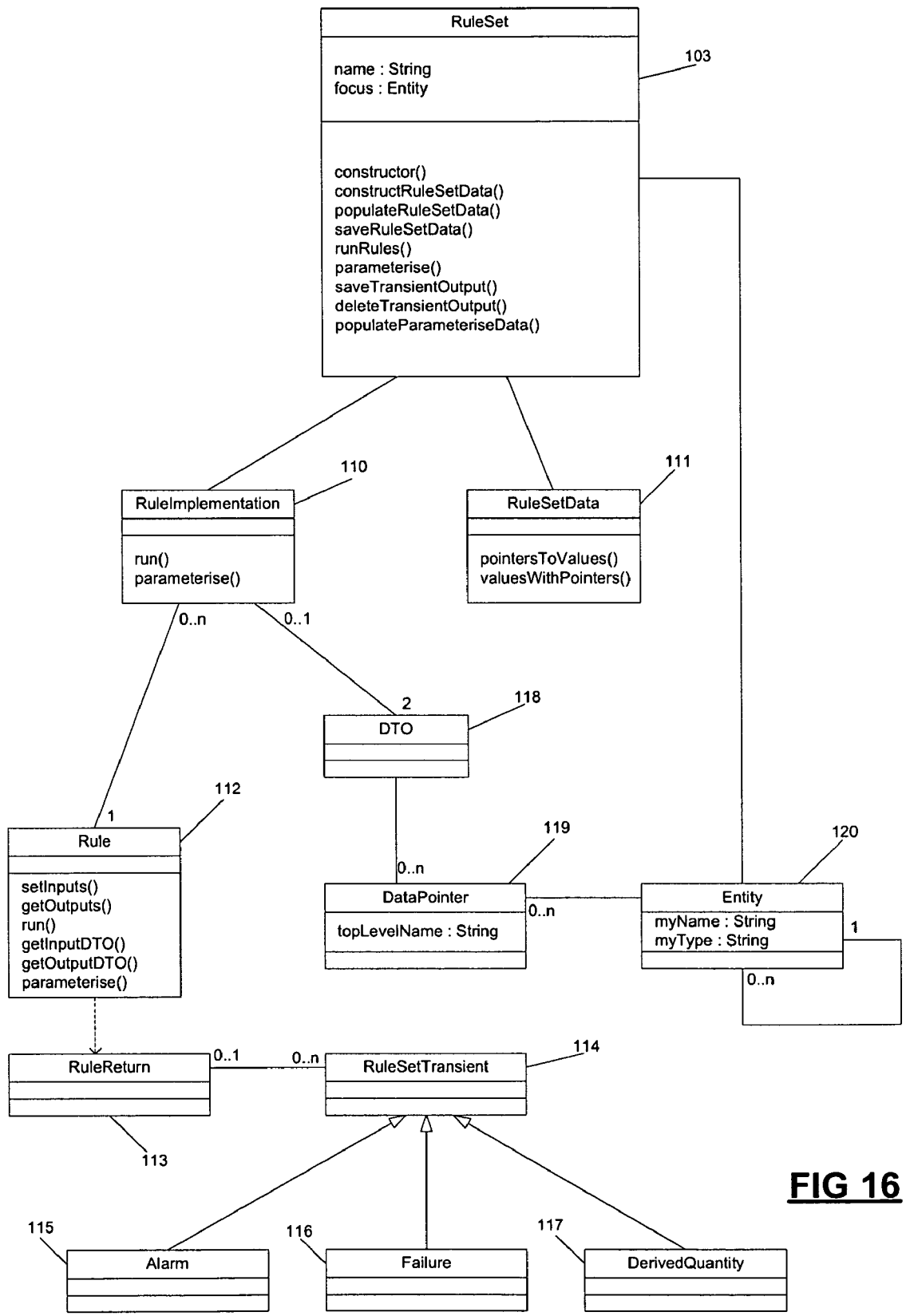
FIG. 16 is a class diagram showing classes having relationships with the RuleSet class of FIG. 15.

Referring to FIG. 16, relationships involving the RuleSet interface 103 are now described. It can be seen that each class implementing the RuleSet interface 103 has an association with a rule implementation class 110. Similarly, each class implementing the RuleSet interface 103 has an association with a RuleSetData class 111. In FIG. 16, relationships involving the RuleImplementation class 110 are illustrated. It can be seen that an instance of the RuleImplementation class 110 has relationships with zero or more instances of a Rule class 112. Objects of the Rule class 112 represent rules within a rule set. It can be seen that the Rule class 112 refers to a RuleReturn class 113 defining details of values returned by a rule represented as an instance of the Rule class 112. The RuleReturn class 113 in turn has a relationship with a Rule-SetTransient class 114 which is a superclass of an Alarm class 115, a Failure class 116 and a DerivedQuantity class 117.

The RuleSetTransient class 114 is used to represent messages returned from execution of a rule and intended for communication to the user. This class is named "transient" because data is only stored for a current day. The Alarm class 115 is used to represent a warning that there was a problem in executing a rule, or with a value used by the rule. However, it should be noted that the Alarm class 115 is only used when an error occurs which is not serious enough to cause failure of execution, or to cause the value calculated by the rule to be flagged as "bad". In contrast, the Failure class 116 is used when execution fails, or when a value created by a rule is flagged as "bad". The derived quantity class 117 is used for communication of data to the user, but is not intended for permanent storage in the database.

It can be seen in FIG. 16 that an instance of the RuleImplementation class 110 has a relationship with two instances of a DTO class 118. One instance of the DTO class 118 is used to refer to inputs to the Rule, while the other instance of the DTO class 118 represents outputs from the Rule. Each instance of the DTO class 118 refers to zero or more instances of a DataPointer class 119. The DataPointer class 119 in turn refers to an Entity class 120. In general terms, the DataPointer class 119 and the Entity class 120 are used by an instance of the RuleImplementation class 110 to identify locations from where data should be read or to which data should be written. This is described in further detail below.

It was mentioned with reference to FIG. 16 that the RuleSet class 103 has a relationship with the RuleSetData class 111. Classes associated with the RuleSetData class 111 are now described with reference to FIG. 17. It can be seen that the RuleSetData class 111 is a subclass of a HashMap class 121. The RuleSetData class 111 essentially contains a linked list containing appropriate data. Therefore, the RuleSetdata class 111 has a relationship with a LinkedList class 122 providing a linked list data structure. As is conventional, the LinkedList class 122 comprises a plurality of entities, each being represented as an instance of the Entity class 120. Each instance of the Entity class 120 has associated data which is represented as an instance of an Entity data class 124. The Entity data class 124 is a super class or an Elasticities class 125 and a Values class 126, and data within the LinkedList can be represented as an instance of the Elasticities class 125 or the Values class 126 as appropriate, depending upon the data. It can be seen that the values class 126 has a relationship with a BasicValue class 127, representing a basic value. The BasicValue class 127 acts as a super class for a DateValue class 128 and a CumulativeValue class 129. The DateValue class 128 and CumulativeValue 129 are used to represent appropriate values. It can be further be seen that the BasicValue class 127 has relationship with a QualityFlag class 130.

As described above, the Elasticities class 125 is used to represent entries within the linked list which represents elasticity data. The Elasticities class 125 has a relationship with an Elasticity class 131 which is itself a subclass of the BasicValue class 127. The Elasticity class 131 is itself a superclass for a CrossElasticity class 132 representing cross elasticity data.

Referring back to FIG. 16, subclasses of the Rule class 112 are now described with reference to FIG. 18. It can be seen that the Rule class 112 is a superclass for six subclasses. A ValidationRule class 133 is used to represent validation rules, a ManagementRule class 134 is used to represent management rules, and a GenerationRule class 135 is used to represent generation rules. Similarly, a PredictionRule class 136 represents prediction rules, an OptimizationRule class represents optimisation rules, and an ElasticityEstimationRule class 138 represents elasticity estimation rules. It will be appreciated that the Rule Class 112 may have other subclasses which are used to represent other rule types.

Figure 18:
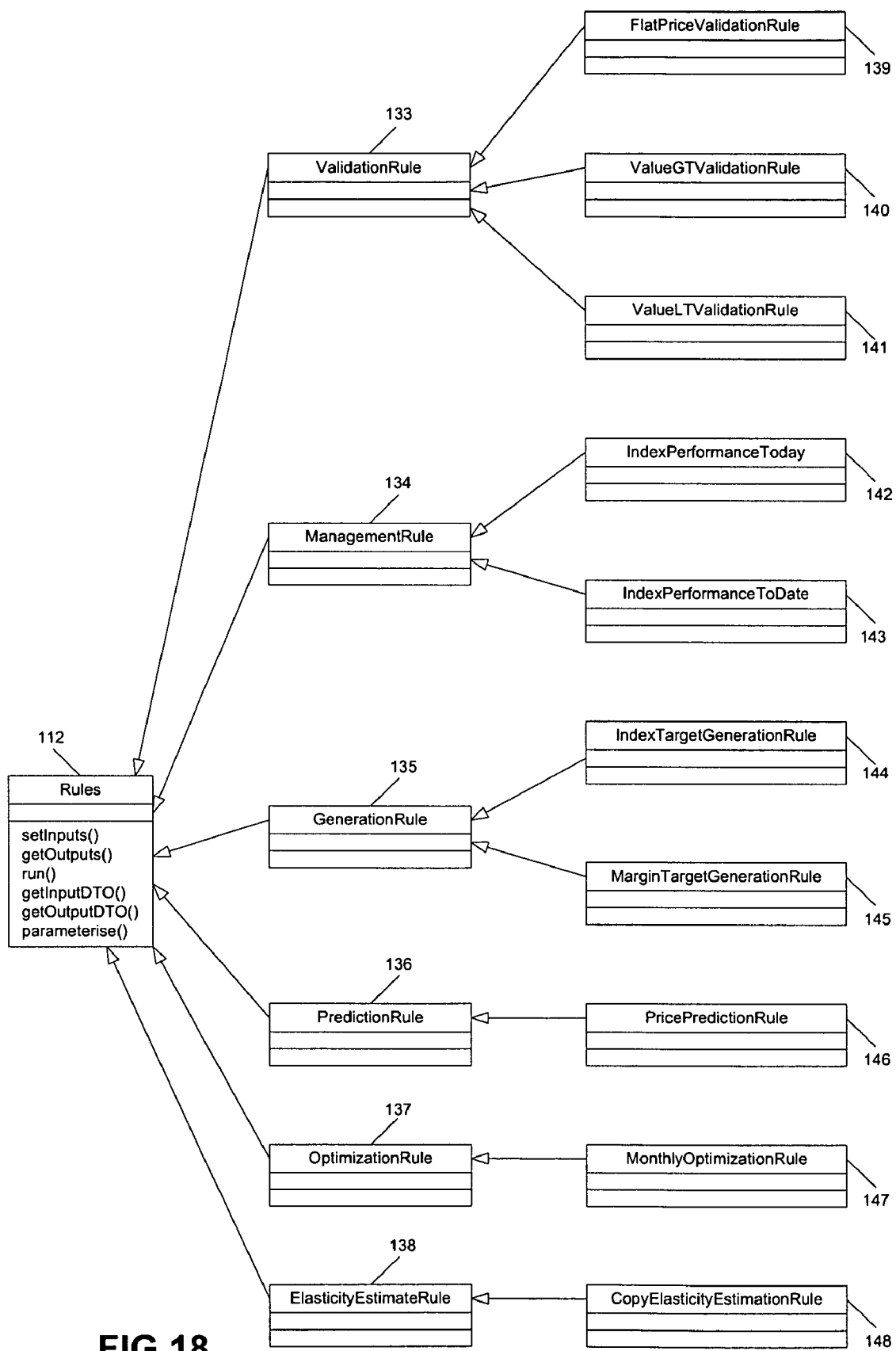
FIG. 18 is a class diagram showing a partial rule hierarchy.

The classes of FIG. 18 described above are all generic to a particular class of rules. However FIG. 18 also shows some particular implementations of the sub classes of the Rule class 112. For example, it can be seen that the ValidationRule class 133 is a superclass for a FlatPriceValidationRule class 139, a ValueGTValidationRule class 140 and a ValueLTVaildationRule class 141. Instances of the subclasses of the ValidationRule class 133 will represent particular rules which are to be executed on data. Similarly, the ManagementRule class 134 has as subclasses an IndexPerformanceToday class 142, and an IndexPerformanceToDate class 143. The GenerationRule class 135 is a superclass for an IndexTargetGenerationRule class 144 and a MarginTargetGenerationRule class 145. The PredictionRule class 136, the OptimizationRule class, and the ElasticityEstimationRule class 138 all have a single illustrated subclass in FIG. 18. Specifically, a PricePredictionRule class 146 is a subclass of the PredictionRule class 136, a MonthlyOptimizationRule class 147 is a subclass of the OptimizationRule class 137 and a CopyElasticityEstimationRule class 148 is a subclass of the ElasticityEstimationRule class 138. It will be appreciated that additional subclasses can be provided, either as subclasses of the Rule class 112, or as subclasses of classes having the Rule class 112 as a parent class.

Figure 17:
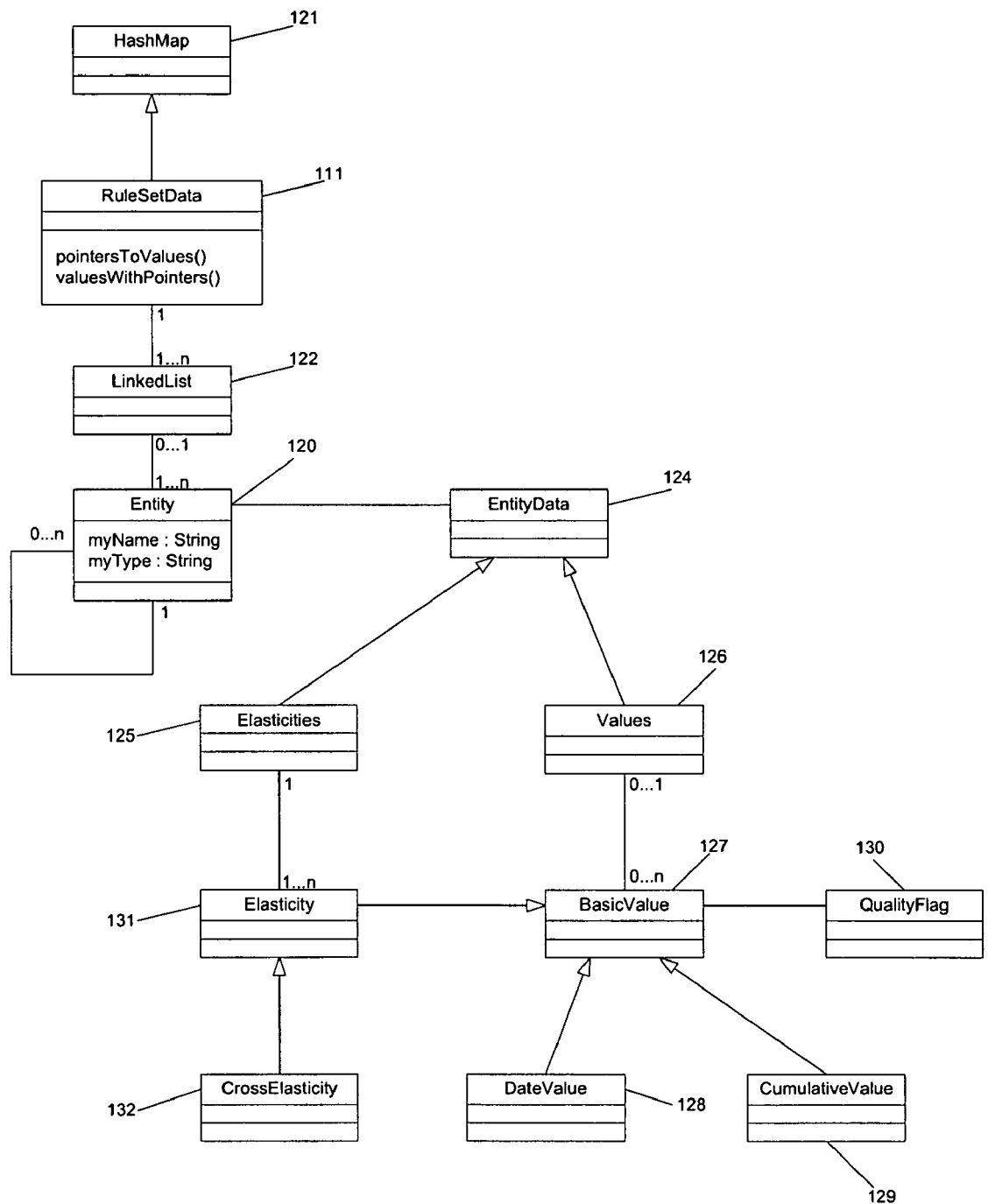
FIG. 17 is a class diagram showing classes having relationships with the RuleSetData class of FIG. 15.
Figure 19:
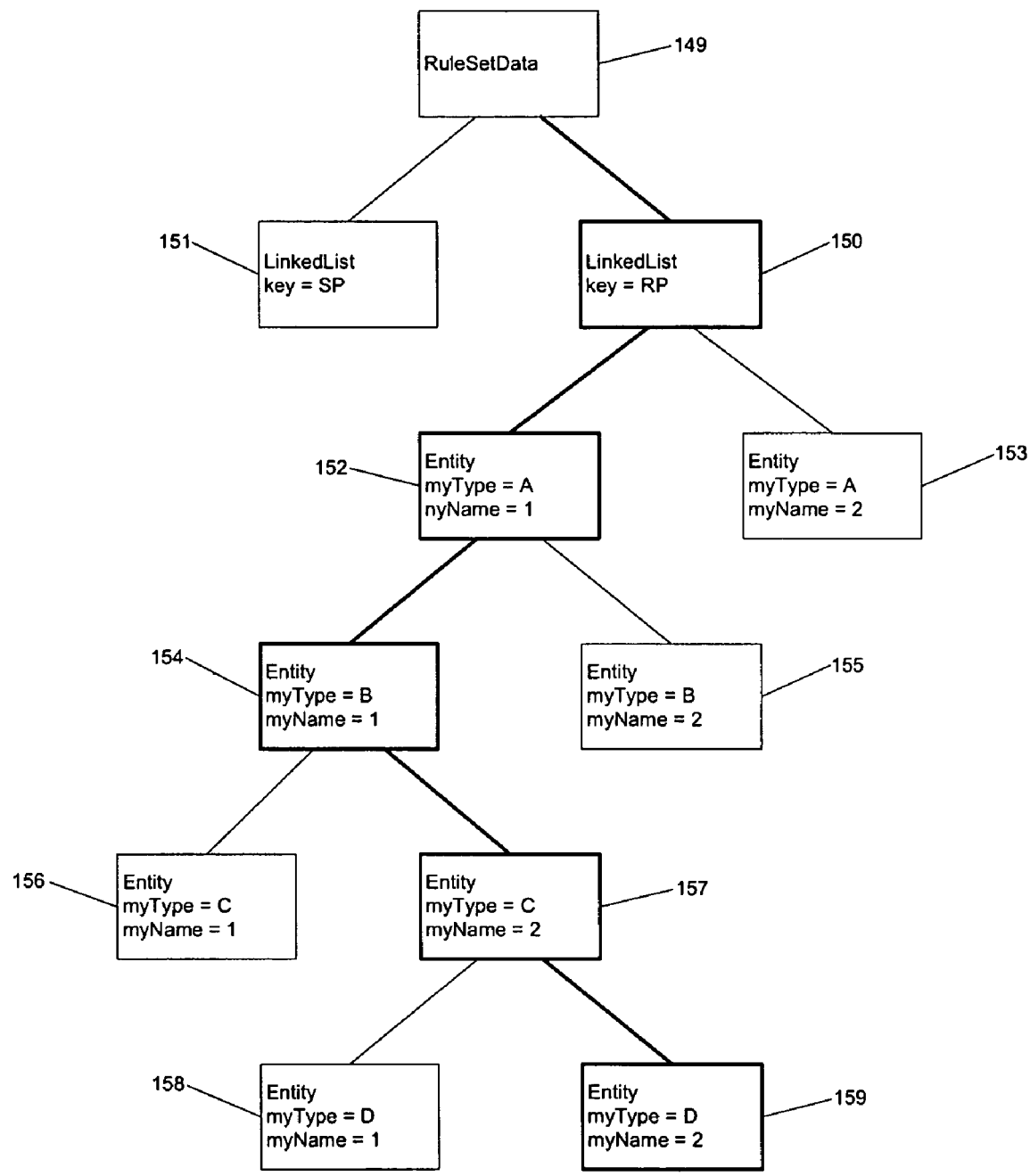
FIG. 19 is an object diagram showing a data structure suitable for use by rules in an embodiment of the present invention.

Having described classes used to implement rule sets in embodiments of the invention, FIG. 19 represents a data structure created using the classes shown in FIG. 17. It can be seen that a RuleSetData object 149 is provided which is an instance of the RuleSetData class 111. The RuleSetData object 149 has two associated LinkedList objects 150, 151 which are instances of the LinkedList class 122. The linked list associated with the LinkedList object 151 is not shown in FIG. 19, although entities associated with the linked list of the LinkedList object 150 are shown in FIG. 19. Specifically, it can be seen that the LinkedList object 150 has two associated Entity objects 152, 153. Each of these Entity objects has suitably instantiated myType and myName parameters. In turn, the Entity object 152 has links to entity objects 154, 155, and the Entity object 154 itself has relationships with Entity objects 156, 157. The Entity object 157 in turn has relationships with an Entity object 158 and an Entity object 159.

Having described an example data structure represented by the classes of FIG. 17 with reference to FIG. 19, navigation of this data using objects which are instances of the DataPointer class 119 and the Entity class 120 (FIG. 16) is now described with reference to FIG. 20. A DataPointer object 160 has a relationship with an Entity object 161. The Entity object 161 in turn has a relationship with an Entity object 162, which in turn has a relationship with an Entity object 163, which in turn has a relationship with an Entity object 164. Using the DataPointer object 160, and the Entity objects 161, 162, 163, 164 shown in FIG. 20, the linked list data structure of FIG. 19 can be traversed. Specifically, it can be seen that the DataPointer object 160 has an associated topLevelName parameter having a value "RP". Thus, the LinkedList object 150 is identified. Having identified the LinkedList object 150, the Entity object 161 has a myType parameter with a value of "A" and a myName parameter with a value of "1". This matches the Entity object 152 of the linked list data structure and accordingly, the Entity object 152 is selected from the Entity objects 152, 153. Similarly, given the values of parameters associated with the Entity object 162, the Entity object 154 is selected in preference to Entity object 155, and again, similarly, the Entity object 163 selects the Entity object 157 of the linked list of FIG. 19 in place of the Entity object 156. Having selected the Entity object 157, the values of the Entity object 164 cause selection of the Entity object 159 in preference to the Entity object 158. Thus, it can be seen that the objects illustrated in FIG. 19A cause a path to be followed through the linked list which is shown in bold lines.

Figure 19A:
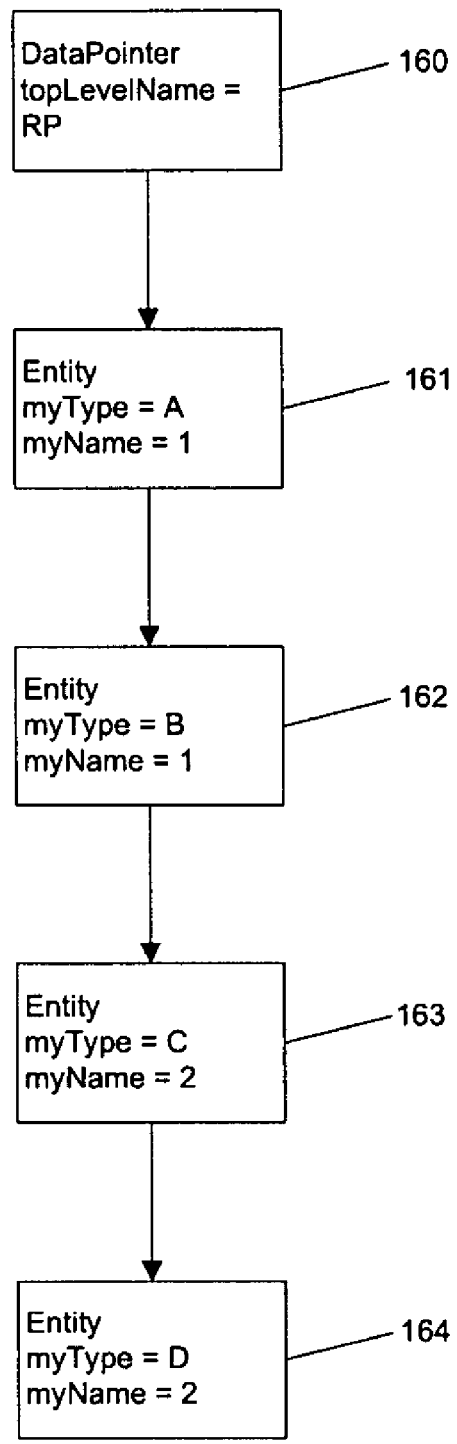
FIG. 19A is an object diagram of objects used to navigate the data structure of FIG. 19.

Having described an example data structure in general terms with reference to FIGS. 19 and 19A, a data structure used to store data used by an embodiment of the present invention is now described with reference to FIG. 20. It can be seen that the data structure of FIG. 20 has an identical structure to that of FIG. 19, however data represented by the data structure of FIG. 20 is applicable to embodiments of the invention.

Figure 20:
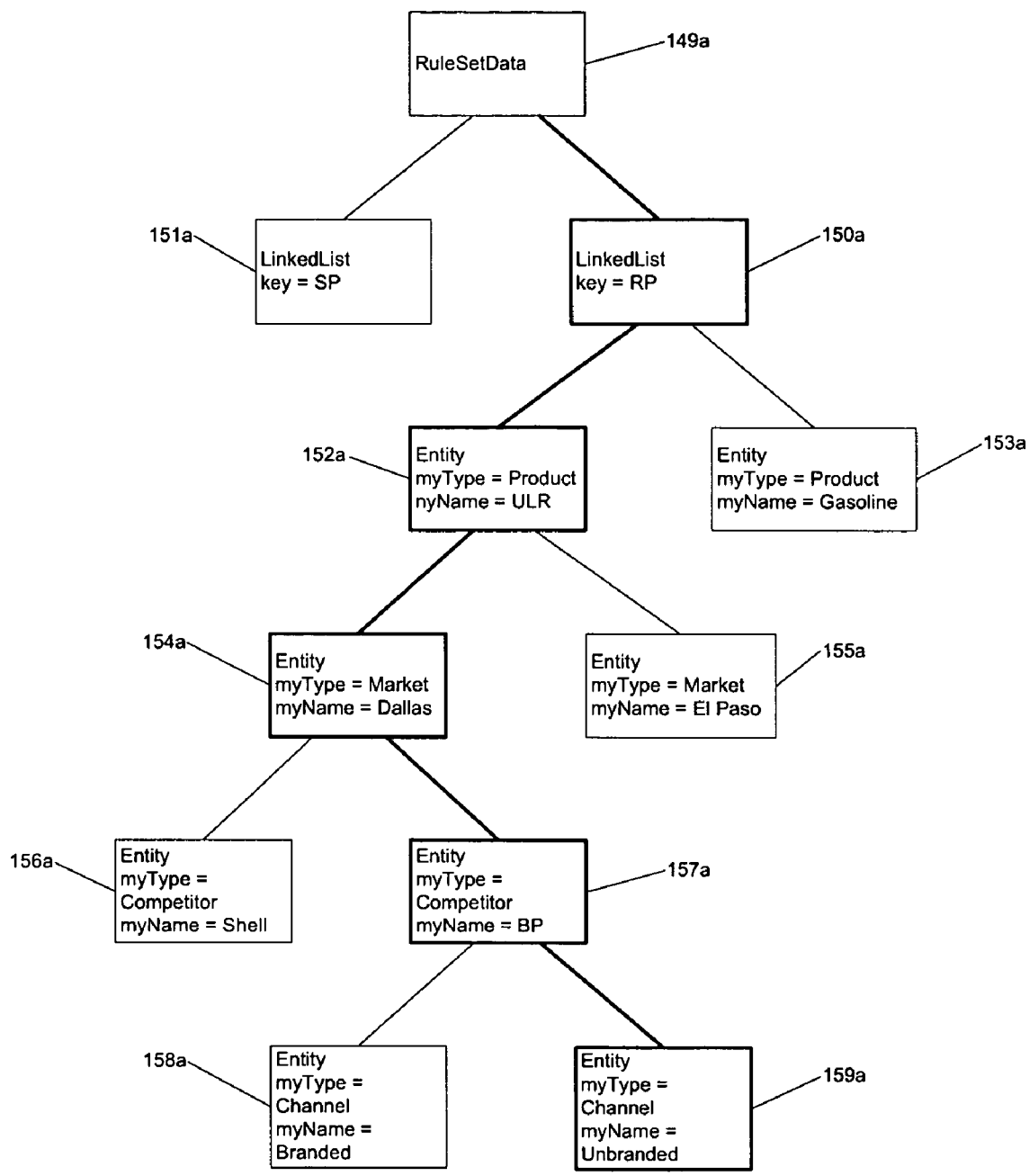
FIG. 20 is an object diagram showing a data structure storing data suitable for use by rules in an embodiment of the present invention.

Referring to FIG. 20, a RuleSetData object 149a has two linked list objects 150a and 151a as children. The linked list object 150a is described in further detail in this example. The linked list object 150a has two child objects 152a, 153a which represent different products which are to be priced in an embodiment of the invention. Each of the child objects 152a, 153a has a myType parameter set to "Product". The child object 152a has a myName parameter set to "ULR", while the child object 153a has a myName parameter set to "Gasoline". Objects associated with the child object 152a are described in further detail here. The child object 152a has two child objects 154a, 155a, each having a myType parameter set to "Market". The child object 154a has a myName parameter set to "Dallas", while the child object 155a has a myName parameter set to "El Paso". Taking the child object 154a as an example, it can be seen that it represents data relating to ULR product (given that it is a child of the object 152a described above). Additionally, it represents data relating to the Dallas market given its own parameter values.

The object 154a has two child objects 156a, 157a, both having a myType parameter set to "Competitor". The child object 156a has a myValue parameter set to "Shell" while the child object 157a has a myValue parameter set to "BP". Thus, the objects 156a, 157a represent data for different competitors which are to be modelled. The object 157a has two child objects 158a, 159a, each having a myType parameter set to channel, thus the myValue parameters of the objects 158a, 159a differentiate between channels of fuel sold by the competitor "BP".

It will be appreciated that the myType and myValue parameters can be used by a rule to identify objects of interest as described above with reference to FIGS. 19 and 19A. Furthermore, having identified objects which are required, the myType and myValue parameters can be used to query a conventional database (such as an SQL database) to obtain data values for use by a rule.

From the preceding description, it will be appreciated that the classes of FIG. 17, instantiated as described with reference to FIG. 20, provide a convenient mechanism for representing data upon which a rule is to act. Furthermore, the use of such classes simply requires a user configuring a rule to have knowledge of the data required, not knowledge of the underlying data itself which may be "hidden" from a user through the object based interface. Another advantage of this approach arises because there is separation from logical rule definition (in terms of data required) and the data itself. Thus, even if data (e.g data for a particular competitor) is currently unavailable, it can still be represented within an object structure of the type described in FIG. 20. In such a case, although a rule is correctly logically defined, its execution will fail because the database lookup cannot be carried out. However it should be noted that separation between logical definition and data availability has been achieved.

It should be noted that in FIG. 15 the RuleSet class 103 has relationships with an EngineEJB class 165, and a ParameteriseEJB class 166. In general terms, these classes 165, 166 trigger use of a Rule set and this is now described with reference to FIG. 21.

Figure 21:
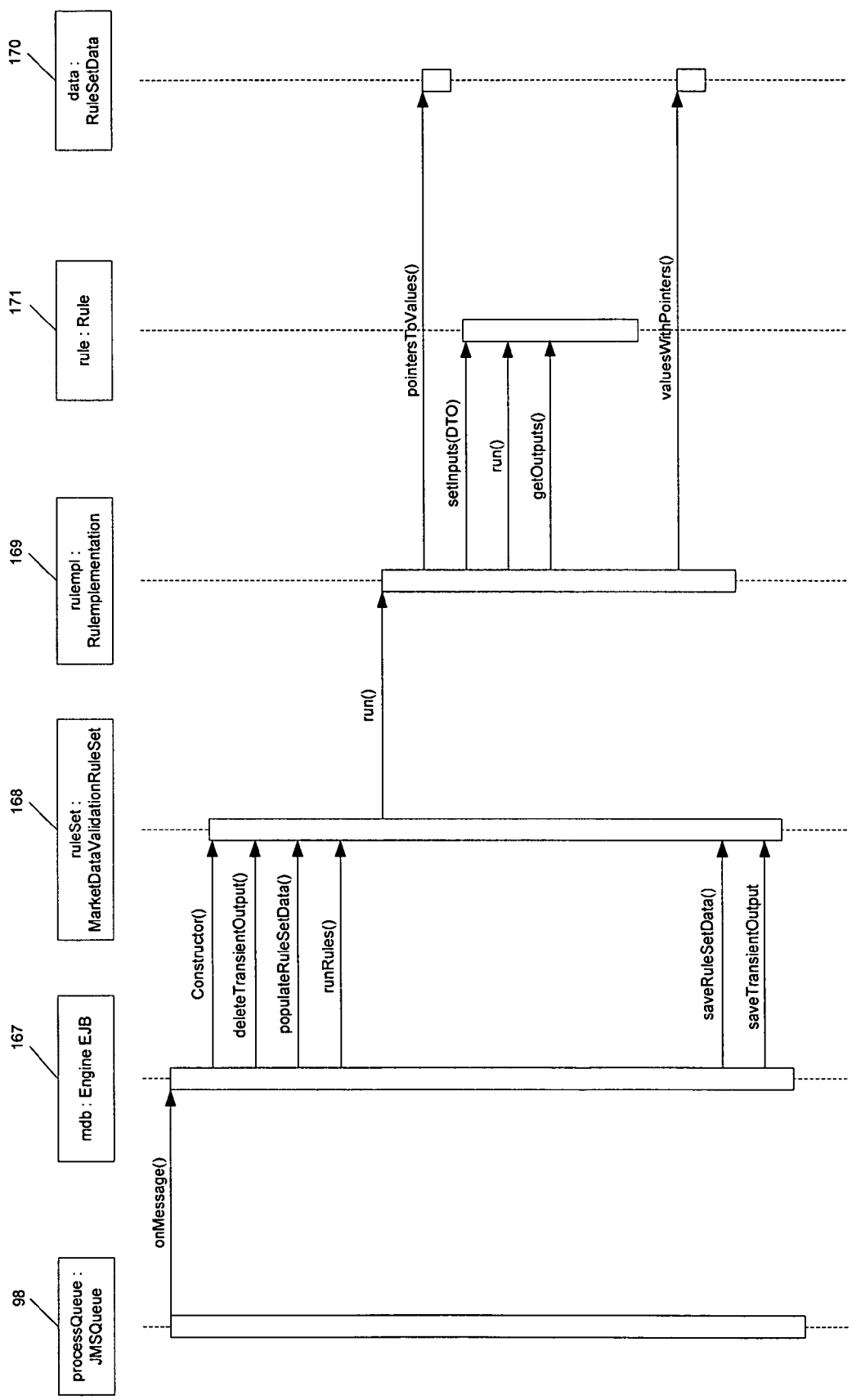
FIG. 21 is a sequence diagram representing execution of a rule set.

Referring to FIG. 21, use of a Rule set is triggered by receipt of a message in the message queue 98. It will be recalled that the schedule operations described above with reference to FIG. 12 cause messages to be placed in the message queue 98. When a message is received by the message queue 98, an onMessage( ) function provided by an mdb object 167 (being an instance of the EngineEJB class 165) is called. On receipt of the call to the onMessage( ) method, the mdb object 167 calls a constrictor method associated with a ruleset object 168. In the embodiment shown in FIG. 21, the ruleset object 168 is an instance of the MarketDataValidationRuleSet class 107, although it will be appreciated that the processing described with reference to this class is repeated for both the MarketDemandEstimationRuleSet class 108 and the MarketPriceGenerationRuleSet class 109. Having called a constructor function associated with the ruleset object 168, a deleteTransientOutput( ) method is then called to delete any transient output associated with the ruleset object. Data associated with the ruleset is then populated by use of the populateRuleSetData( ) method, and having populated data appropriately, a runRules( ) method is called to cause rules associated with the ruleset object 168 to be applied.

The rule set object 168 then calls a run( ) method associated with a Ruleimpl object 169 which is an instance of the RuleImplementation class 110. The Ruleimpl object 169 then cause pointers to appropriate data values to be obtained using a data object 170 which is an instance of the RuleSetData class 111. Having obtained appropriate pointers to data (by traversing a linked list data structure of the type described above) the ruleimpl object 169 calls a setInputs method provided by a rule object 171 which is an instance of the Rule class 112. This provides appropriate data to the rule, and a run( ) method is then called by the ruleimpl object 169 so as to cause the rule object 171 to apply the rules. This method call will return a ruleReturn object which is an instance of the RuleReturn class 113. A getOutput method is then used to obtain Output data from the rule, and output data obtained in this way is provided to the data object 170 for storage.

Having completed this processing, the mdb object 167 then calls a saveRuleSetData( ) method to store outputs of the rules in the database, and a saveTransientOutput( ) method stores transient objects created by the rules in the database in a serialised form. The processing described with reference to FIG. 21 has been concerned with processing of a single rule set and of a single rule within that rule set. It will be appreciated that similar processing is required for each constituent rule of each rule set.

The description above referring to FIG. 21 has been concerned with operation of a rule set. However, it should be noted that before processing FIG. 21 can be carried out the Rule Set must be created. This process involves making a call to a constructor or set data method associated with the Rule set. This method call constructs a RuleSetData object and its substructures, and fixes data scope of the RuleSet. That is, data to be associated with the rule is specified, as described further below. Additionally, before being run, the rule set must be parameterised. Parameterisation of a rule set is an asynchronous process which is triggered by an object of the parameterisedEJB class 166 calling a parameterise( ) method provided by the Rule set class 103. Having parameterised the rule set, it can be serialised in an XML form and stored in a database. The stored XML is then retrieved when the rule set is to be applied.

Reference has been made above to a database from which data is read, and to which data is written. This database is a relational database comprising a plurality of tables. Creation and population of such database will be well known to one of ordinary skill in the art, and is therefore not described in further detail here.

It has been described above that rule sets used in an embodiment of the invention are represented by instances of the MarketDataValidationRuleSet class 107, the MarketDemandEstimationRule set class 108, or the MarketPriceGenerationRuleSet class 109. Details of the way in which these classes are used, and that which is represented by these classes, are now described. Considering first market data validation rule sets represented by instances of the market dataValidationRuleSet class 107, these rule sets are in general concerned with validating data relating to a particular market, where a market is represented by a plurality of competing wholesalers operating at a single terminal of the type shown in FIG. 1. A market data validation rule set will contain all rack prices for a given day at that terminal, the data identifying product type, competitor and demand/channel combinations at the terminal. The previous day's actual spot prices for primary and secondary spot supply regions containing the market will also be included. Cost data relevant to the terminal will also be included within the input data. The output data will comprise status flags on all the current day's rack prices at the market, and status flags on all the previous day's actual spot prices for the primary and secondary spot supply regions containing the terminals. The status flags will indicate whether or not the required input data has been received. The input data will be arranged with respect to a predetermined product hierarchy. That is, if a rule is scoped at product type level, then a specific choice of product type is made and only data items associated with the product type value are visible. Similarly, if a rule is scoped at product grade level within a particular product type, then a specific choice of product grade is made and all data items with product type values within the specified product grade are visible. Market data validation rule sets will comprise only data validation rules, which are described in further detail below.

Market price generation rule sets represented by instances of the MarketPriceGenerationRuleSet class 109 take as input data rack prices for a given day at that terminal, and all a following day's predicted rack prices at that terminal. The previous day's actual spot prices and the current day's estimated spot prices will also be comprised within the input data. Volumes of products sold at that terminal on the preceding day will also be included, as will predicted volumes for the day being processed. Other data such as cost data and elasticity estimates is also included within the input data. The output data will include all the following day's prices to be implemented for the wholesaler carrying out the processing, together with predictions for prices for other wholesalers. The input data scope is arranged in a manner analogous to that of market data ValidationRuleSets described above. Market price generation rule sets comprise price prediction rules, price generation rules, price generation rules of optimisation type, price validation rules and management rules. Rules which are described in further detail below.

Market demand estimation rule sets represented by instances of the MarketDemandEstimationRuleSet class 108 will operate on input data comprising rack prices for a current day and a previous day. Spot prices for the previous day and indeed earlier spot prices may also be included within the input data. Volumes of products sold on the previous day together with elasticity estimates for the previous day will also be included. Output data will comprise elasticity data and predicted volume data for the current day.

Using instances of the MarketDataValidationRuleSet class 107, the MarketDemandEstimationRuleSet class 108, and the MarketPriceGenerationRuleSet class 109, users create pricing rules which are to be applied to all products to be priced at a given terminal or market. When rules are executed, all pricing rules related to price items at a single terminal will execute in one block in user-specified sequence.

Having described various rule set types, the rules included within those RuleSets are now described.

Validation rules are used in two contexts. General data validation is performed on new sets of actual rack price data and previous day closing spot price data after it is received. Price validation is performed on generated prices to ensure that price objectives are met. Although validation rules are used in two contexts, a common generic structure is used for both contexts.

In general, validation rules return a Boolean value indicating pass or fail. Various types of validation rules are shown in Table 1, which indicates properties associated with the various types of rules.

TABLE 1

| Rule Type | Properties |
| --- | --- |
| Flat Price | Maximum allowed period |
| Value greater than | Limit |
| Value less than | Limit |
| One day change greater than | Limit |
| One day change less than | Limit |
| Differential greater than | Limit and reference value |
| Differential less than | Limit and reference value |
| One day change in differential greater than | Limit, current reference value, previous reference value |
| One day change in differential less than | Limit, current reference value, previous reference value |

Price generation rules generate prices at which the wholesaler is to offer products for sale at a particular terminal. These rules in general return either a price value or an indication of failure. Table 2 shows the various types of price generation rules.

TABLE 2

| Rule Type | Inputs | Properties |
| --- | --- | --- |
| Index Target rule (outputs value) | Predicted competitor prices | Definition of Competitors and Demand Channels (for same Product and Area) making up the index price<br>Weights to apply to each price in the index<br>Targeted Differential to the index price |
| Index Constraint rule (outputs range) | Predicted competitor prices | As above, but with Constraint defined as a Differential to index price |
| Margin Target rule (outputs value) | Unit Cost (either spot plus transport and terminalling or own cost) | Targeted differential to the unit cost |
| Margin Constraint rule (outputs range) | Unit Cost | As above, but with Constraint defined as a Differential to unit cost |
| Product Differential rule (outputs value) | Price of reference grade | Differential to reference grade |
| Price rounding rule (outputs value) | Unrounded price | List of permitted price points |
| Default price rule (outputs value) | | |

Management rules are concerned with performance monitoring and produce a derived quantity such as a margin or alternatively an alarm or failure condition. An alarm may be generated if the derived quantity exceeds or is below some predefined limit. Table 3 shows various characteristics of various types of management rules.

TABLE 3

| Rule Type | Inputs | Properties |
| --- | --- | --- |
| Index Performance Today rule - outputs deviation today between own price and index if it exceeds threshold | Actual Competitor prices<br>Actual Own price | Definition of Competitors and Demand Channels (for same Product and Area) making up the index price<br>Weights to apply to each price in the index<br>Targeted Differential to the index price<br>Threshold at which to report deviation |
| Index Performance To Date rule - outputs running total of (signed) daily deviation between own price and index over reporting period if it exceeds threshold | Vectors of actual Competitor prices to date within reporting period<br>Vector of actual Own price to date within reporting period<br>Current day index within reporting period | As above<br>Plus definition of reporting period (e.g. monthly) and renewal point (start of month) |
| Predictive Performance Today rule - outputs deviation between today's actual price and yesterday's predicted | Today's actual price<br>Yesterday's predicted price | Threshold at which to report deviation |

TABLE 3-continued

| Rule Type | Inputs | Properties |
|---|---|---|
| price, if it exceeds threshold | | |
| Predictive Performance To Date rule - outputs root mean square deviation between today's actual price and yesterday's predicted price over reporting period, if it exceeds threshold | Vector of actual prices to date within reporting period Vector of corresponding predicted prices to date within reporting period | Threshold at which to report deviation |
| Margin Performance Today rule - outputs deviation today between actual and target margin if it exceeds threshold | Today's actual own price Today's actual own unit cost (e.g. yesterday' spot plus T&T) | Target margin Threshold at which to report deviation |
| Margin Performance To Date rule - outputs deviation between average daily margin over reporting period and target daily margin if it exceeds threshold | Vector of actual own price to date within reporting period Vector of actual own unit cost to date within reporting period | Target margin Threshold at which to report deviation |

Price prediction rules use predictive models to predict competitor prices. When such a rule is created, a stepwise regression algorithm is invoked to estimate model parameters, and during use, a price prediction model monitors its predictive ability using diagnostic statistics, so as to update the stepwise regression model over time.

Elasticity estimation models take as input a current elasticity estimate in the form of a multivariate prior distribution, a new observation vector of prices, and corresponding new estimation of volume. As output, such rules generate updated elasticity estimates in the form of a multivariate posterior distribution.

Price optimisation rules are a specific type of price generation rules. They take a variety of price data as input, and generate a sequence of optimised prices for an entire planning period.

Figure 22:
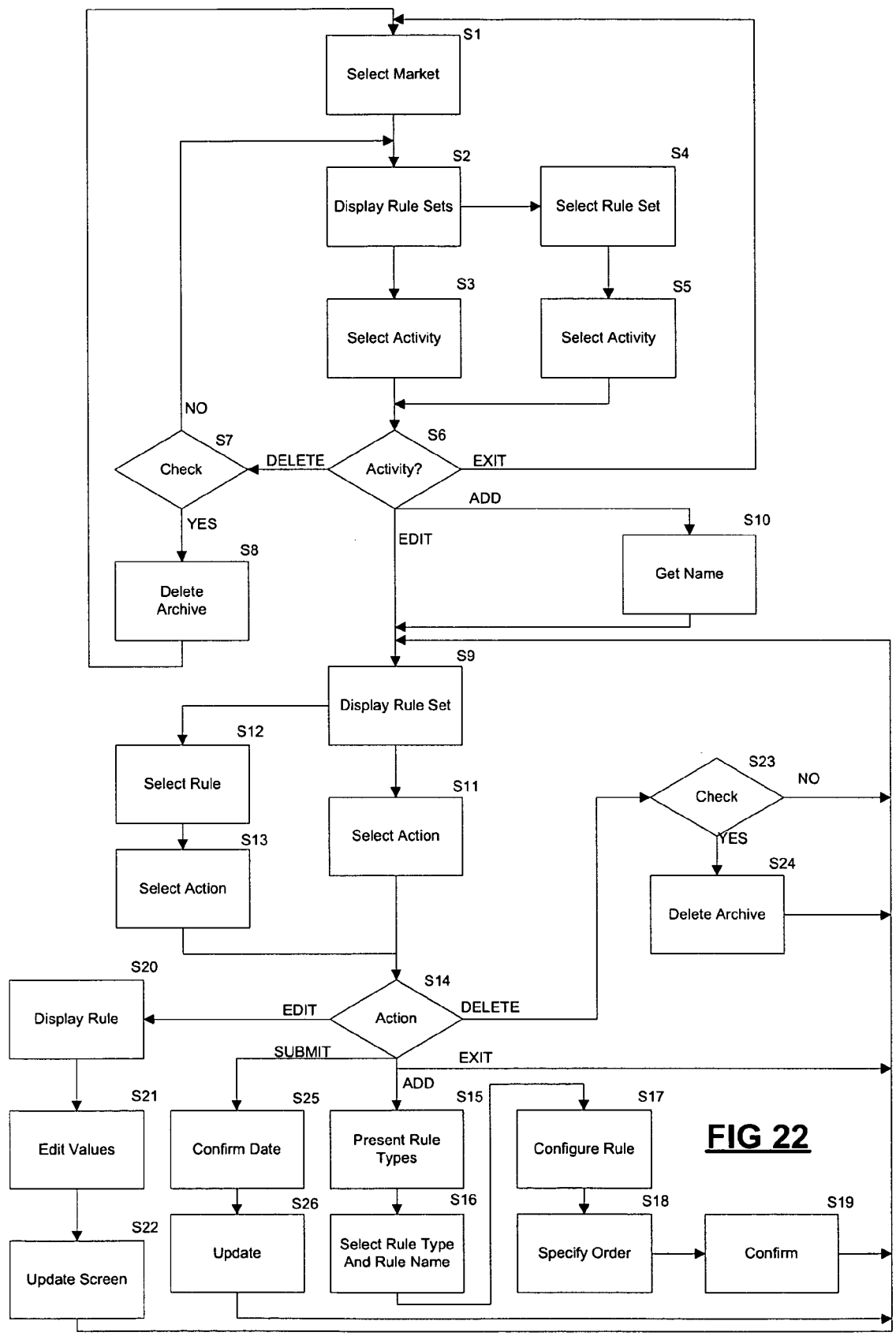
FIG. 22 is a flowchart of a process for configuring a rule set represented by instances of classes shown in FIG. 16.

Having described both the classes used to implement rules and rule sets, and the use of various rules and rule sets, configuration of such rules and rule sets is now described with reference to FIG. 22, and FIGS. 22A to 22G. FIG. 22 is a flowchart of a process for user configuration of rule sets and associated rules, while FIGS. 22A to 22G are screenshots of a GUI configured to carry out the processing of FIG. 22.

Figure 22A:
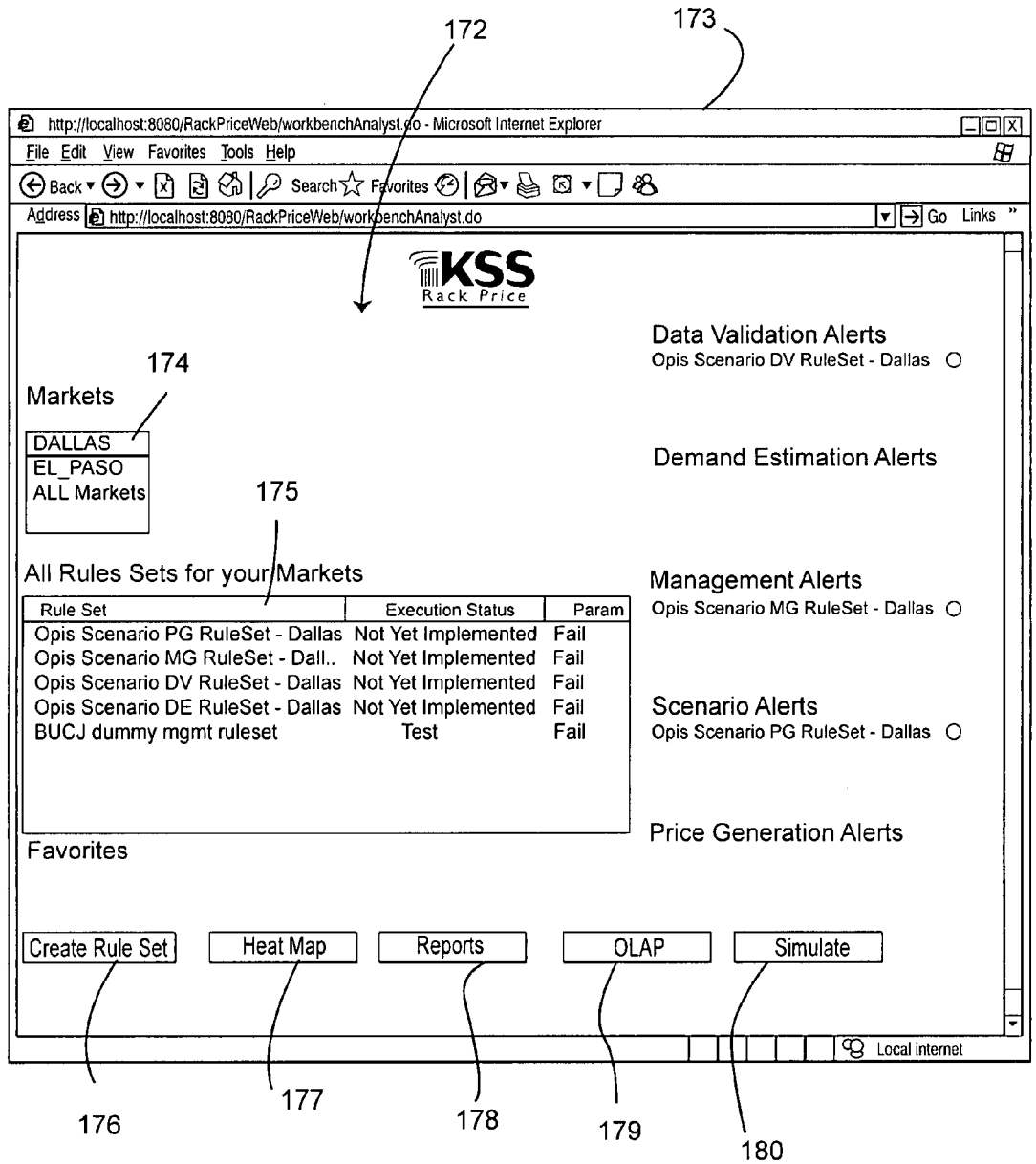
FIGS. 22A to 22G are screenshots taken from a graphical user interface (GUI) configured to implement the process of FIG. 22.

Referring to FIG. 22A, a GUI 172 used to implement early stages of processing shown in FIG. 22 is illustrated. It can be seen that the GUI 172 is web-based being displayed in a web-browser window 173. The GUI 172 includes a list of markets 174 for which rule sets can specified and modified. At step S1 of FIG. 22, a user selects a market from the list of markets 174 for which rule sets and/or rules are to be configured. Having selected a market at step S1, at step S2 a set of rule sets associated with the selected market is displayed to the user in a list 175.

Thereafter, at step S3, a user selects an activity associated with the rule sets displayed in the list of rule sets 175. Activities are selected using buttons provided in a favourites area of the GUI 172. Supported activities include addition of a rule set, deletion of a rule set, editing of a rule set, or Exit. Creation, editing and deletion of rule sets are all accessed using a Create Rule Set button 176, editing and deletion being possible only when a rule set is selected in the rule set list 175.

Accordingly, processing may pass from step S2 to step S4 where a particular rule set is selected, and an activity (i.e. editing or deletion of a rule set) is then selected at step S5. The GUI 172 additionally provides a Heat Map button 177 used to access a heat map (also known as a tree map) display of performance data by market in a visual presentation in which each market is represented by a square on the screen and in which urgency and importance are visually displayed using the colouring and sizing of the squares, a Reports button 178 used to access various reporting functionality, an OLAP button 179 used to access Online Analytic Processing (OLAP) functionality providing slice- and dice analysis of data and a Simulation button 180 using to access simulation functionality.

From either step S3 or step S5, processing passes to step S6 which is a decision block determined by the selected activity. If a user selects Exit (using a button not shown in FIG. 22A), processing simply returns to step S1. If, however, the user selects deletion of a selected rule set (again using a button not shown in FIG. 22A), the user is prompted to confirm deletion at step S7, and if deletion if confirmed, then deletion of the Rule set occurs at step S8, although the deleted Rule set is written to an archive, so as to be retained for audit purposes. Processing then returns to step S1. If, when prompted at step S7, the user fails to confirm deletion, no deletion takes place, but processing simply returns to step S2.

If the user selects an Edit activity at step S5 (using GUI elements not shown in the Figures), processing passes from step S6 to step S9 where the selected Rule set is displayed within an appropriate graphical user interface as is described in further detail below.

Figure 22B:
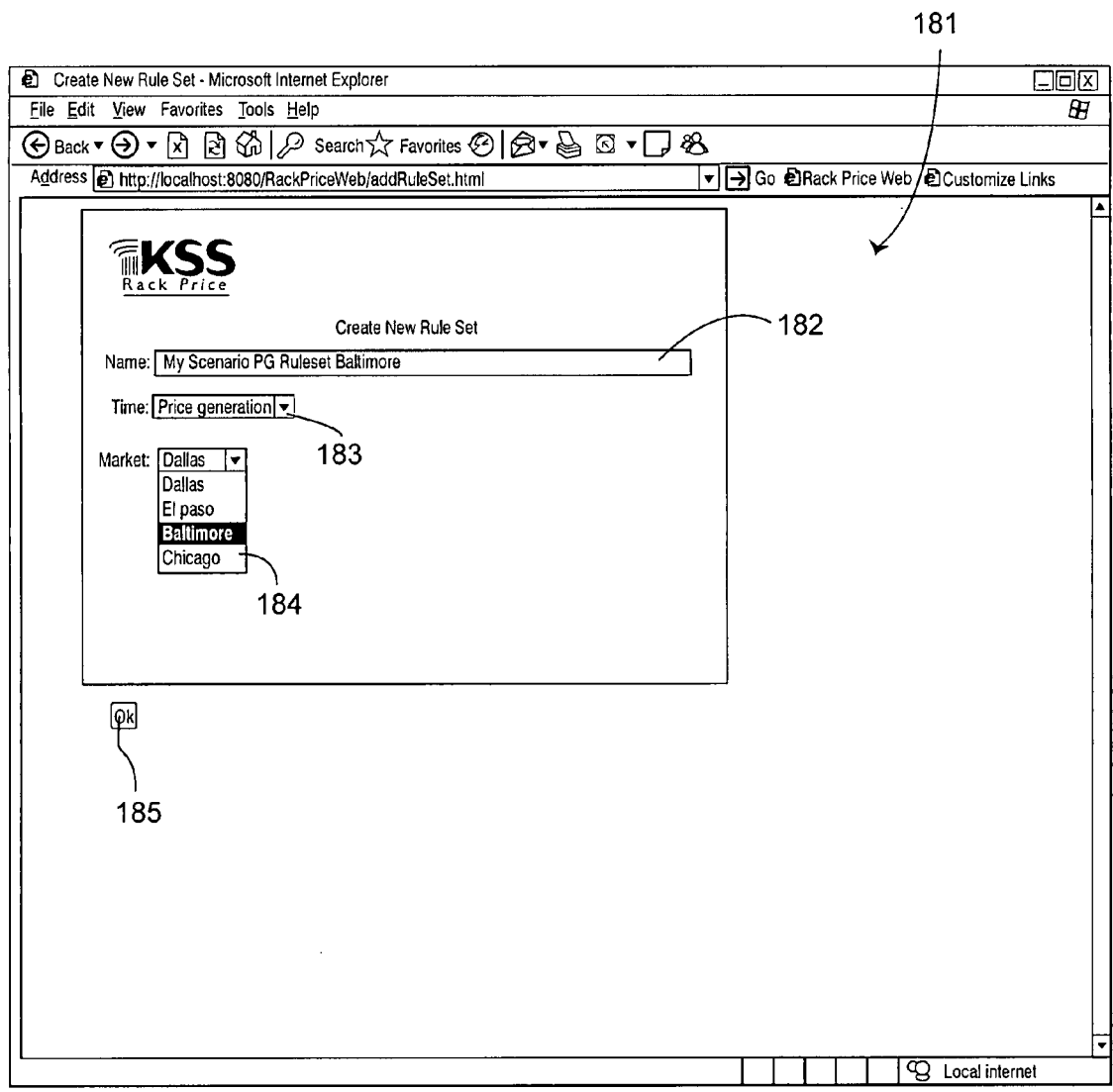

If at step S3 a user selects addition of a rule set (using the Create Rule Set button 176), processing passes from step S6 to step S10 where the new rule set is configured using a GUI 181 shown in FIG. 22B. Referring to FIG. 22B, it can be seen that the GUI 181 comprises a textbox 182 used to specify a name for the new rule set, a drop down list 183 used to specify a type for the new rule set and a drop down list 184 used to specify a market. Having carried out appropriate configuration of the new rule set, creation is caused by the user selecting an OK button 185.

It was described above that if at step S3 a user chooses to edit a rule set, processing passed to step S9. Having carried out configuration using the GUI 181 of FIG. 22B, processing for creation of a new rule set also continues at step S9. Thus, the following description is applicable both to editing of an existing rule set, and configuration of a rule set newly created using the GUI 181 of FIG. 22B. At step S9, the rule set is displayed using a GUI 186 (FIG. 22C).

Figure 22C:
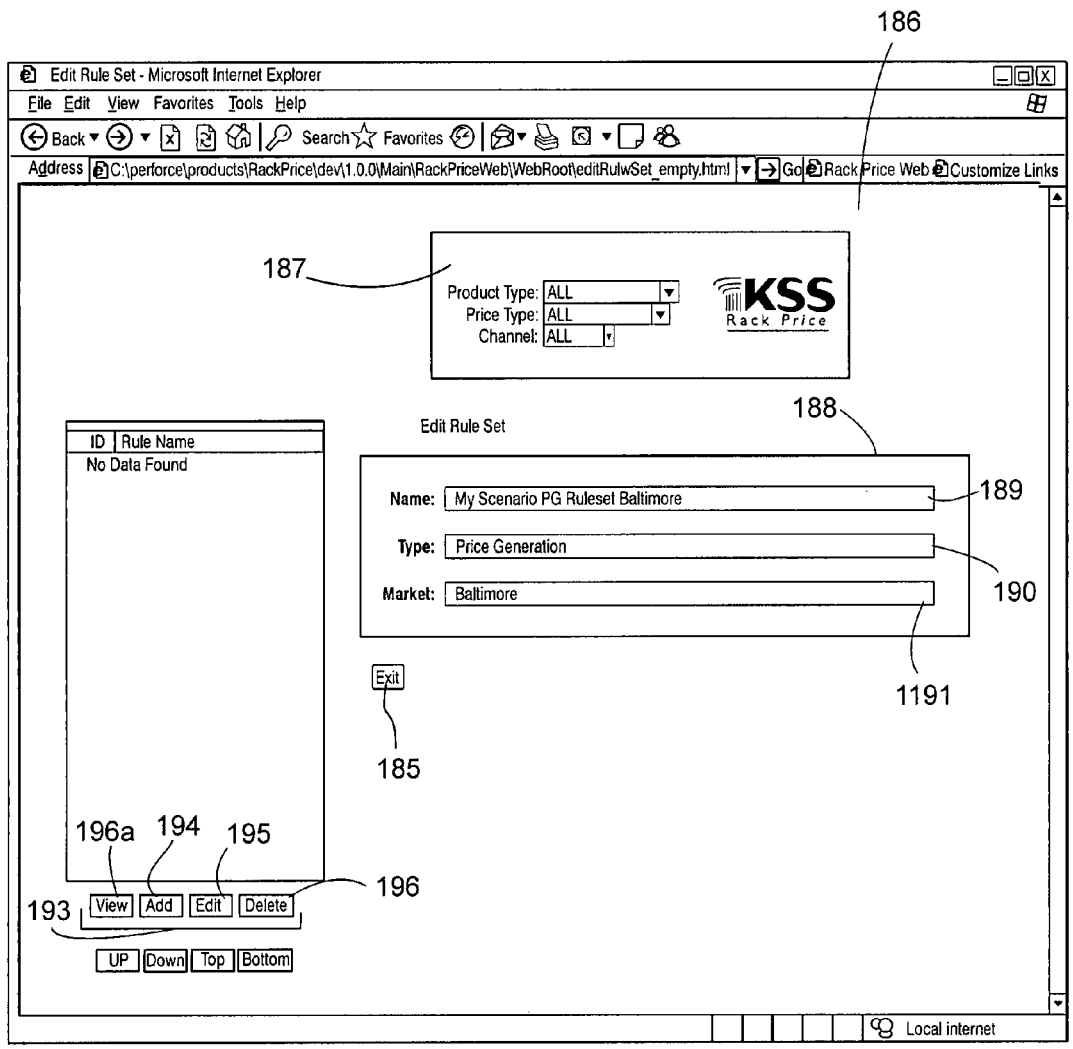
Figure 22D:
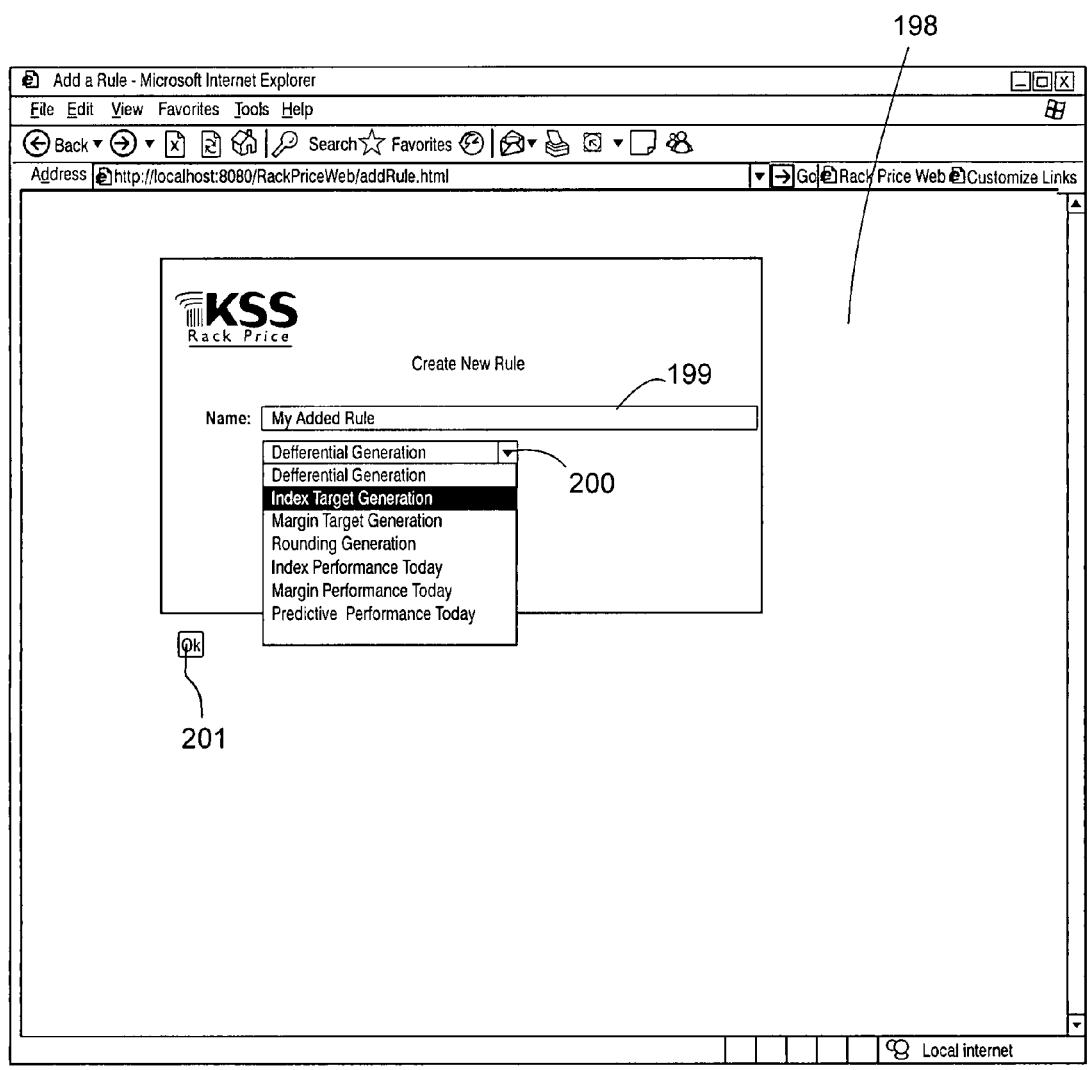

Referring to FIG. 22C, the GUI 186 comprises an area 187 containing filtration parameters which can be used to affect data displayed using the GUI 186. An area 188 includes a text box 189 indicating the rule set's name, a text box 190 containing the rule set's type and a text box 191 indicating the market associated with the rule set. Thus, the rule set configuration data input via the GUI of FIG. 22B is included within the area 188 of the GUI 186. The GUI 186 further comprises an area 192 which lists rules which are members of the displayed rule set.

Referring back to FIG. 22, from step S9, a user selects an action to be carried out at step S11. This selection is carried out using buttons 193 (FIG. 22C) which are described in further detail below. Actions which can be selected include addition (using a button 194), editing (using a button 195) deletion (using a button 196) and viewing (using a button 196*a*) of Rules. Exit and Submit actions are also available, the Exit action being carried out using a button 197. In a similar way to the selection of activities, editing and deletion can only be selected if a particular rule within the selected rule set is selected. Therefore, processing may pass from step S9 to step S12 where a particular rule of the displayed rule set is selected, and then to step S13 where a particular action to be associated with the selected rule is selected. Processing passes from step S11 or step S13 to step S14 which is a decision block determined by the selected action. If a user selects the Exit action, processing returns to step S9.

The various actions are now described with reference to FIG. 22. The GUIs used to implement such actions are described in further detail below.

If a user selects the Add action, processing passes to step S15 where various rule types together with their associated subtypes are presented for selection by the user. Such selection is carried out at step S16. Having selected a particular rule type, processing passes to step S17 where the rule is configured using an appropriate configuration screen. This configuration involves entry of parameter values into text boxes and identification of data input by navigating through available data associated with the rule set within which the rule is contained. The user is then prompted to specify a position for the new rule in the execution sequence, and such a position is specified at step S18. Addition of the rule is then confirmed at step S19, processing then returns to step S9 where the rule set is again displayed.

If at step S13 the user selects an Edit action, the configuration screen for the selected Rule is displayed at step S20. A user can then modify parameter values using appropriate text boxes, and also modify specification of input data by navigating appropriate data structures. The position of the Rule within the execution sequence can also be modified. Such modification is carried out at step S21. In response to modification carried out at step S21, the Rule set is updated (step S22), before processing returns to step S9 where the Rule set is again displayed.

If a user selects a Delete action at step S13, processing passes from step S14 to step S23. Again, the user is prompted to confirm deletion, and if such confirmation is made then processing passes from step S23 to step S24 and then back to step S9, where the Rule set is displayed. It should be noted that in addition to deletion of the selected Rule, step S24 also writes the deleted Rule to an archive for audit purposes. If, when prompted to confirm deletion at step 23, a user fails to confirm deletion, processing simply returns to step S9.

If at step S11 the user selects the Submit action, processing passes from step S14 to step S25. At step S25 the user is prompted to indicate whether the update should apply immediately, or at the next pricing run. The specification made at step S25 is applied at step S26, and processing then returns to step S9.

Figure 22E:
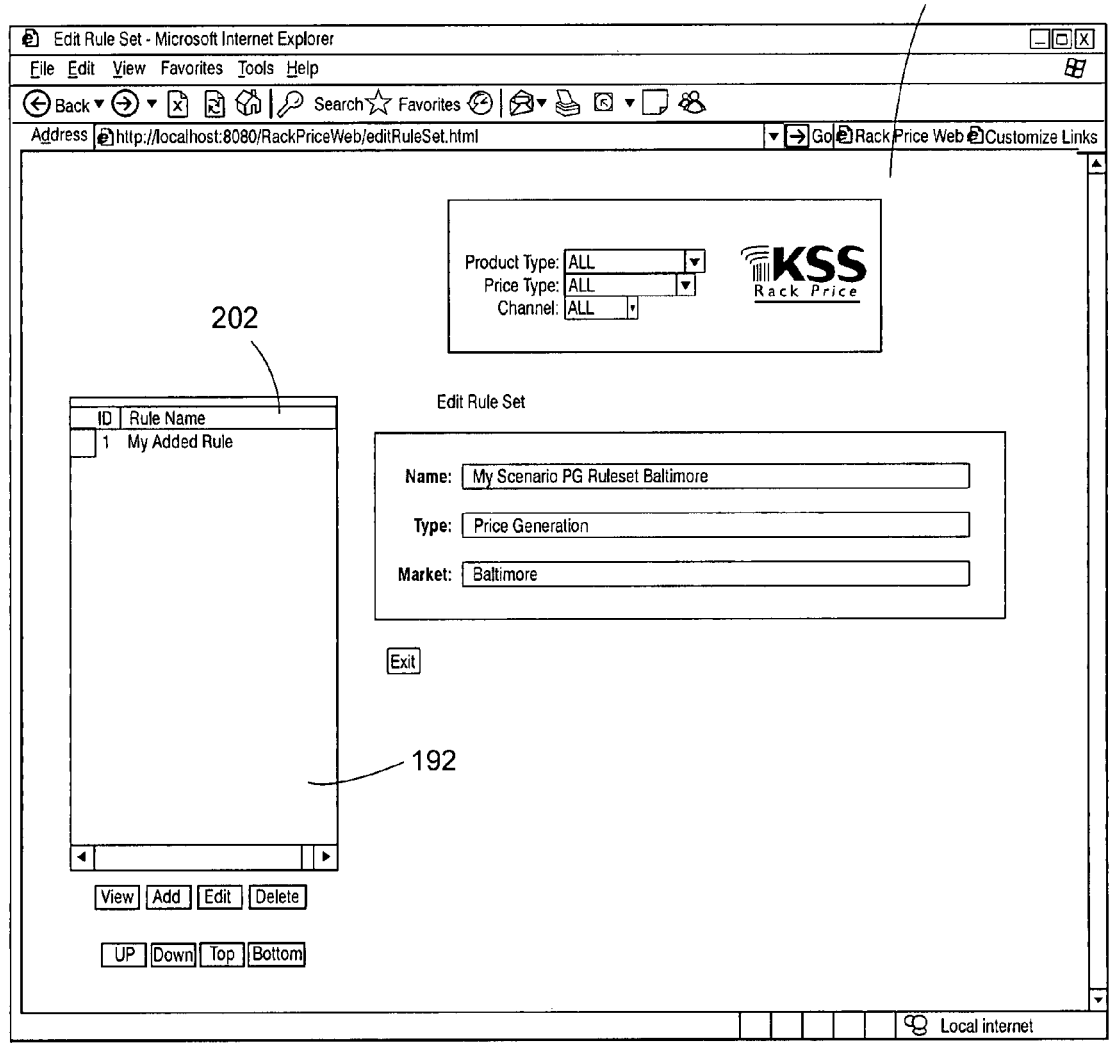

Referring back to FIG. 22C, addition of a rule is triggered by using the button 194, in response to which a GUI 198 (FIG. 22D) is displayed. The GUI 198 comprises a text box 199 which is used to assign a name to the new rule and a drop down list 200 which is used to assign a type to the rule. Having assigned a name and type to the rule (at steps S15 and S16 of FIG. 22), the rule is added using an OK button 201, at which time the GUI 186 is again displayed, as shown in FIG. 22E. Here it can be seen that the list of rules 192 includes a newly added rule 202, being the rule created using the GUI of FIG. 22D.

Figure 22F:
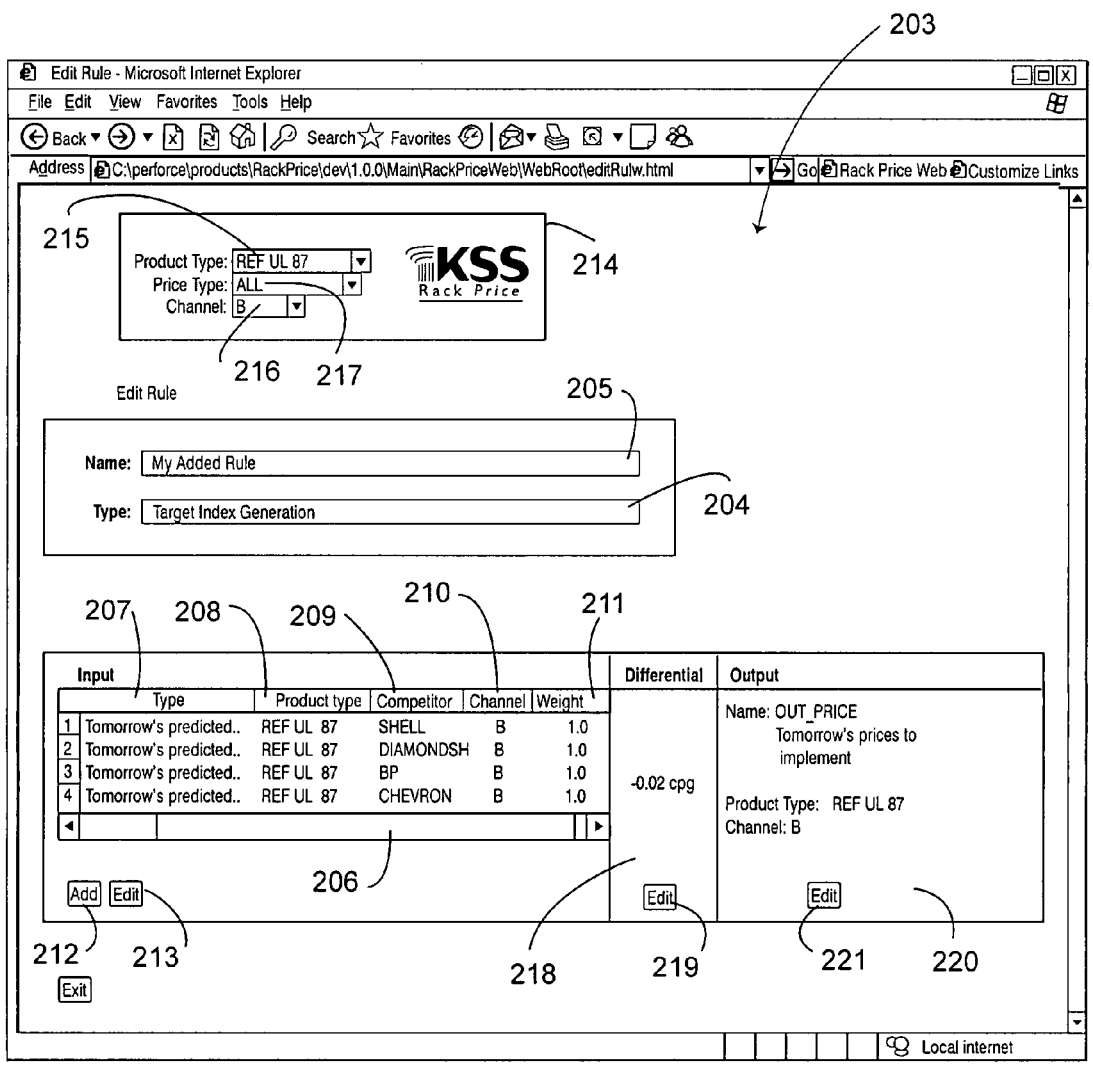

FIG. 22F shows a GUI 203 used to edit a rule. A text box 204 displays a name for the rule and allows this name to be modified. A text box 205 displays the rule's type and allows this to be modified. An input table 206 is used to specify input data upon which the rule is to act. It can be seen that the input table 206 comprises a type column 207 indicating data type, a product type column 208 a competitor column 209, a channel column 210 and a weight column 211. It will be appreciated that the columns displayed in the input table 206 will vary depending upon the nature of the data which is to be used by the rule. Data items are added to the input table 206 using an add button 212, and appropriate drop down lists. Existing entries can be edited using an edit button 213.

The GUI 203 also comprises an area 214 which is used to limit values which can be selected from drop down lists used to add data items to the input table 206. Specifically, it can be seen that a drop down list 215 has been used to restrict product type selections to "REF UL 97", and a channel drop down list 207 has been used to limit channel selections to "B" (indicating branded). A price type drop down list 217 has not been used to limit user selections, and accordingly a user can call all price types to the input table 206. It should be noted that the area 214 therefore effectively allows data items selectable by a user to be restricted.

The GUI 203 also comprises a differential parameter 218 which is set using an edit button 219. An area 220 indicates details of data output by the rule, and this is edited using an edit button 222.

It will be appreciated that the GUI of FIG. 22F can be used to edit rules as described with reference to FIG. 22.

Figure 22G:
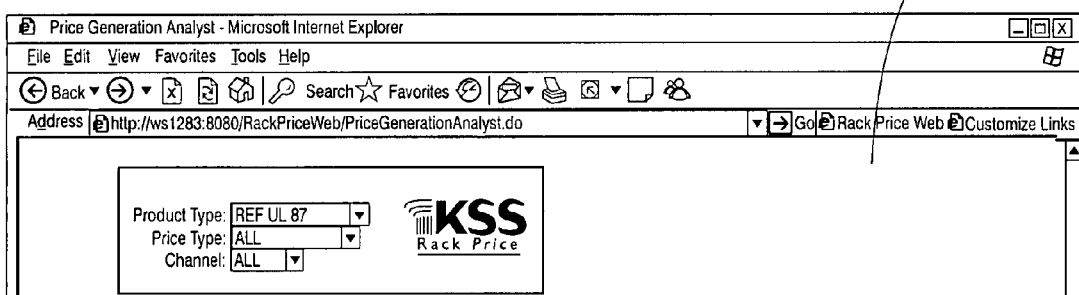

Referring to FIG. 22G, a GUI 223 is illustrated which is displayed during execution of a rule set. An area 224 lists rules to be executed in execution order, an area 225 indicates predicted prices generated by the rules, and an area 226 indicates prices that have been implemented.

From the preceding description of FIG. 22 it will be appreciated that the present invention provides an interactive interface which the user may use to configure various rules to affect operation of the system. The rules to be configured can affect both price generation, price prediction and general operation of the system (e.g. data validation). As has been described above, all rules and rule sets implemented by embodiments of the invention use a common set of classes, and configuration of these rule sets and rules is therefore carried out through appropriate population of variables associated with those classes. It will be readily understood that the operations described above, particularly relating to the configurations of values associated with rule sets and particular rules, can be affected simply by modifying appropriate parameters associated with instances of the classes.

As described above, embodiments of the invention provide methods which can be used to predict competitor prices. The rules generally generate a plurality of values for:

$$p(\text{predicted change}) \tag{1}$$

which indicates the probability of a predicted price change. However, predictions can be improved by collating historical data in a table of the form shown in FIG. 23. The table comprises two columns a first indicating predicted change values, and a second indicating delta values ($\Delta$), where the delta values indicate actual changes which have taken place in response to the same combination of input values.

Given the table of the form shown in FIG. 23, and the value of equation (1) shown above equation (2) set out below can be evaluated:

$$p(\Delta_i \mid \text{predicted change}) = \frac{p(\text{predicted change} \mid \Delta_i) p(\Delta_i)}{\sum_{j=1}^{N} p(\text{predicted change} \mid \Delta_j) p(\Delta_j)} \tag{2}$$

By evaluating equation (2) a probability of actual changes based upon historical data can be determined and the most likely actual change based upon this calculation can then be used to predict price change. Using this technique it is likely that accuracy of prediction will be increased. In particular, it should be noted that in general the techniques for determining the value of equation (1) will be based upon continuous mathematics and a continuous range of predicted change values can therefore be selected. However, it is known from data analysis that some price changes are far more likely than others, such knowledge is effectively taken into account by evaluation of equation (2) set out above.

Figures 23, 23A:
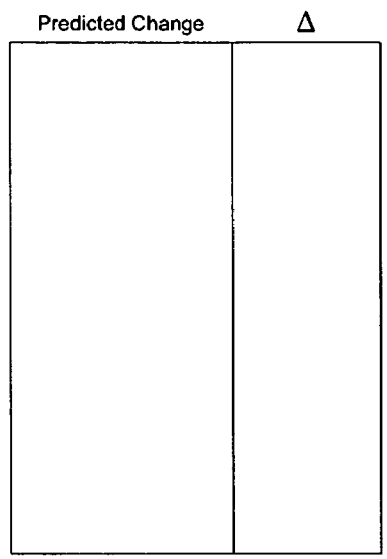
FIGS. 23 and 23A are schematic illustrations of an historical data set used in an embodiment of the present invention.

In order to obtain the conditional probability values required by equation (2) it is necessary to generate from the table of FIG. 23 a table of the form shown in FIG. 23A. That is, for each discrete prediction value in the table of FIG. 23 a number of occurrences of a particular change ($\Delta$) is counted so as to generate the table of the form shown in FIG. 23A. Having done this p(predicted change $\Delta$) terms of equation (2) can be computed by selecting a value of $\Delta$ upon which the probability is conditional and then determining from values stored in FIG. 23A the probability of a given prediction.

Although the method described above can be used to improve accuracy of pricing decisions it should be noted that the table of FIG. 23A is very large, thereby necessitating a large quantity of storage space. Furthermore, much of this storage space is in fact wasted because many cells of the table will contain '0' values.

Therefore, in a preferred embodiment of the present invention, equation (2) is replaced by equation (3) set out below.

$$p(\Delta i \mid predictedchange) = \frac{p(predictedchange, N(\Delta i, \sigma)) p(\Delta i)}{\sum_{j=1}^{N} p(predictedchange, N(\Delta j, \sigma)) p(\Delta j)} \tag{3}$$

Here, it can be seen that the conditional probability terms of equation (2) have been replaced by terms p(predicted change, N($\Delta$i, $\sigma$)) which represent the probability of observing the value "predicted chance" in a normally distributed population having mean $\Delta$i and variance $\sigma$. The value of $\sigma$ for the normal distribution is computed from FIG. 23A. More specifically, approximately 90% of the data is used as a training set to determine the value of $\sigma$. Having carried out this training operation the remaining 10% of the data is used to determine whether the results are within a predetermined precision threshold. It will be appreciated that this process may be repeated until appropriate $\sigma$ value is determined. It will also be appreciated that a different normal distribution is computed for each column of the table of FIG. 23A.

It will be appreciated that the use of equation (3) in conjunction with normal distributions is preferred given that table 23A need only be stored for a short time during which the normal distributions are being determined.

In preferred embodiments of the invention improved accuracy achieved using equation (2) or (3) is used only if specified by a user.

In addition to providing improved techniques for price prediction, embodiments of the invention also provide techniques for monitoring the affect of various variable changes on competitor pricing. Such techniques are now described.

In particular, these techniques provide a convenient user interface for monitoring competitor prices trends. Such user interfaces shown in FIG. 24.

Figure 24:
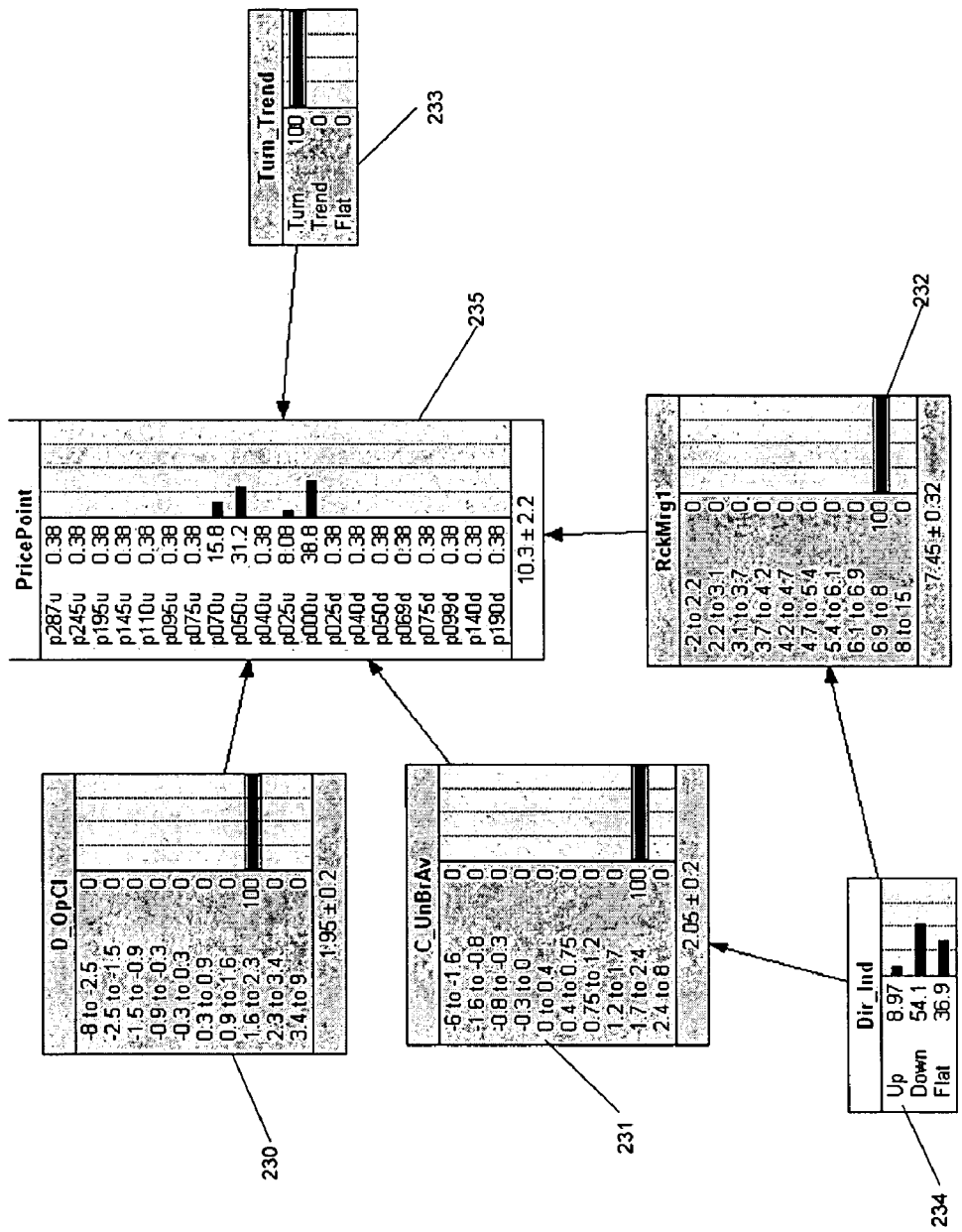

Referring to FIG. 24, the illustrated interface comprises six user interface elements. Four of these user interface elements are concerned with receiving user input data. Specifically, a first input user interface element 230 receives data indicating a previous day's change in spot price. A second input user interface element 231 indicates a previous day's differential to average unbranded price. A third input user interface element 232 indicates a previous days margin on the basis of the price at which fuel was sold, while a fourth input user interface element 233 indicates whether spot price trend turned direction on the previous day as compared to the day before. A user interface element 234 provides data indicating relationships between data represented by the second user interface element 231 and the third user interface element 232. An output user interface element 235 shows historical data indicating probabilities of competitor price changes based upon input values specified using the first to fourth input user interface elements 230, 231, 232, 233. It can be seen for the values specified using the input user interface elements 230, 231, 232, 233 there is a 38.8% probability of no price change, a 31.2% probability of a half cent increase, a 15.8% probability of a 0.7 cent increase, and an 8.08% probability of a 0.25 cent increase.

Figure 24A:
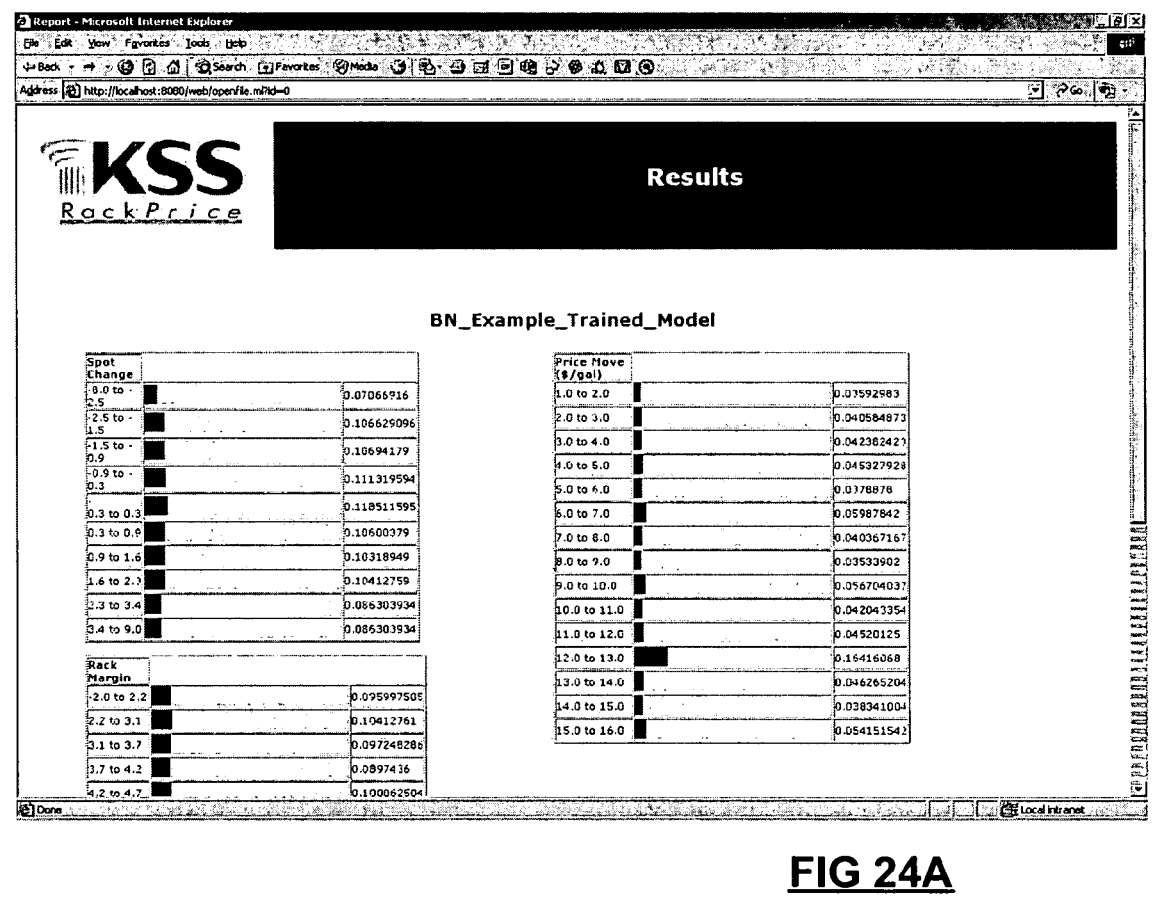

Thus, from FIG. 24 it can be seen that a user is provided with convenient interactive user interface elements with which parameters which affect a competitors pricing can be specified, and in response to specification of these parameters competitor price changes are displayed in the output user interface element 235. It should be noted that in general terms the input user interface elements 230, 231, 232, 233 can receive a plurality of values for respective input variables, each having an associated probability. These probabilities can then be used to compute output data. An alternative embodiment of the user interface of FIG. 24 is shown in FIG. 24A.

A computer program configured to process the input data shown in FIG. 24 so as to generate the requisite output data can function in a number of ways. In one simple implementation, a table is stored storing all possible combinations of the four input variables, together with a price change caused by that combination of variables. That is, for each combination of input variables a plurality of rows will exist within the table, each specifying an output value, the table being populated with historical data. When input data is received via the user interface of FIG. 24 all rows of the table having values for the input data as specified by the input user interface elements are selected, and price changes associated with those rows are processed so as to determine probabilities for display in the output user interface element 235 in the manner described above.

In an alternative implementation of the interface of FIG. 24, a Bayesian Belief Network (BBN) model is used. Such a model involves a network comprising six nodes, one node for each of the user interface elements shown in FIG. 24. Each of the node objects has properties which define their state and the probabilities associated with those states. Thus, in order to generate output data for display using the output user interface element 235 a belief property associated with each of the four nodes representing input data is set as illustrated in FIG. 24. Having set nodes representing input data in this way node representing output data will be automatically be updated by the BBN model with output data in that way can be determined.

Additionally, when using a BBN model, it must be trained from historical data so as to learn relevant conditional probabilities. Again, this process starts with a saved template defining input variables, and the dependencies between those variables and the output variables. In order to train the BBN model it is first necessary to select a target competitor and then select a number of terminals over which pricing behaviour is to be analysed.

Figure 25:
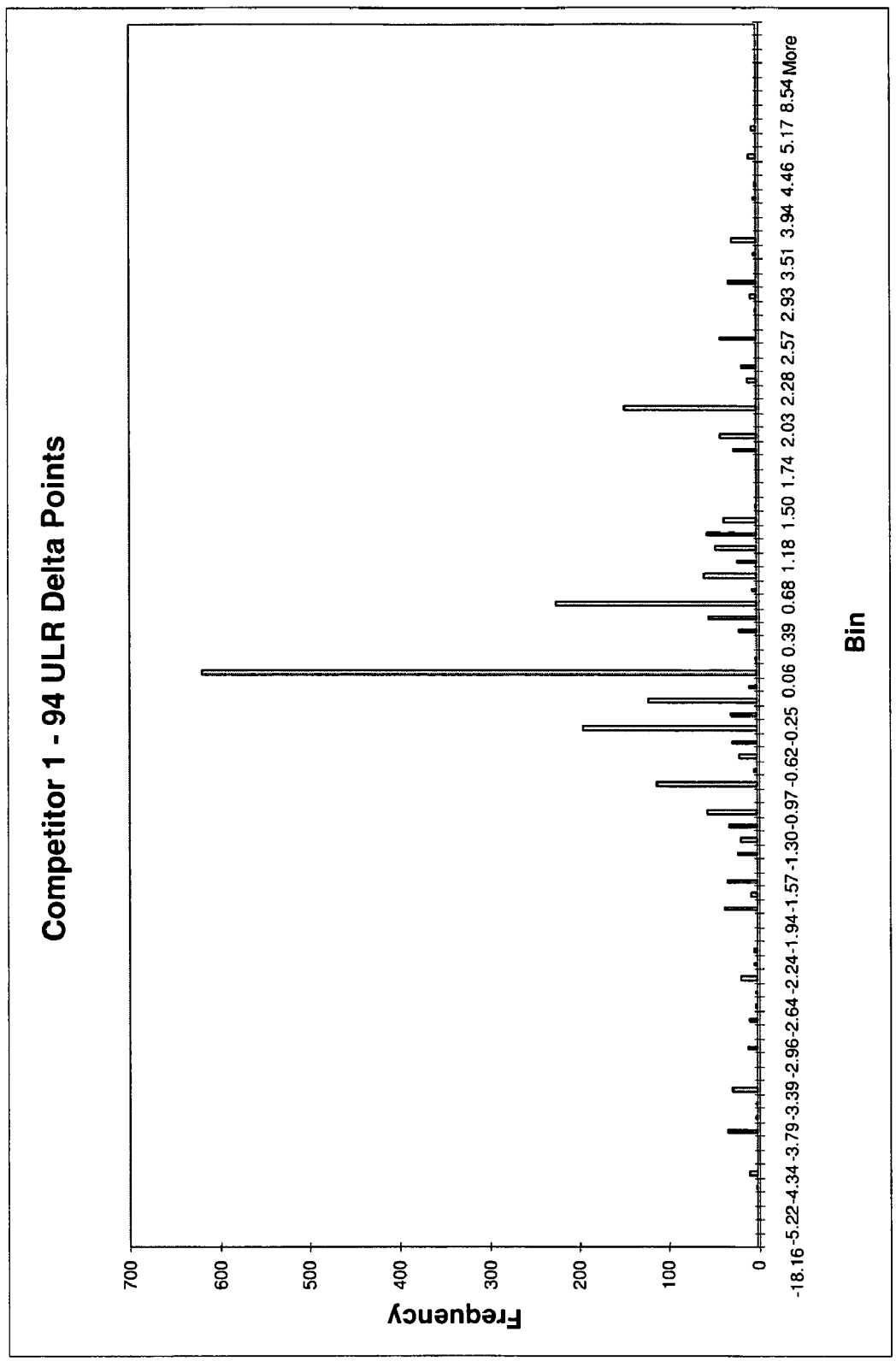

Competitor price history can be represented in one of two ways. Prices can be represented as a finite set of about twenty of the most frequently occurring price moves made by that competitor within the specifics price period. Such a technique is likely to be appropriate where competitor price data is of a form as shown in FIG. 25 where a small number of price moves accounts for the vast majority of price changes made by that competitor. However, in a situation as illustrated in FIG. 26, where a far larger number of price moves are routinely made by a competitor selecting only the twenty most frequently occurring price moves would eliminate a large quantity of data. In such a circumstance it is preferred that all data is clustered within a plurality (for example twenty) price move groups. Before defining these groups very large and very small price changes which are made very infrequently are removed from the data, and the remaining data is then divided into a contiguous set of bins. Having determined bow the price data is to be processed, probabilities for various price moves in response to various values of the input variables can then be computed and used to generate conditional probabilities.

It will be appreciated that although the description set out above is focused upon a single competitor data from a plurality of competitors can be used in embodiments of the invention.

Although preferred embodiments of the present invention have been described above, it will be appreciated that various modifications to those embodiments can be made without departing from the spirit and scope of the present invention.

The invention claimed is:

1. A computer implemented method for displaying values for a fuel price variable indicative of a prediction of a competitor's price change, the method comprising;
    displaying a first user interface element configured to present values of a first input variable affecting said fuel price variable;
    displaying a second user interlace element configured to present values of a second input variable affecting said fuel price variable;
    displaying a third user interlace element configured to present values of the fuel price variable indicative of a prediction of a competitor's price change, said fuel price variable varying in dependence upon said first and second input variables;
    receiving first user input of a value for said first variable via said first user interlace element;
    receiving second user input of a value for said second variable via said second user interface element;
    storing a set of values of said fuel price variable;
    determining a probability for each of said values of said fuel price variable indicative of a prediction of a competitor's price change based upon values of said first and second input variables; and
    updating said displayed third user interface element in response to said first user input and said second user input to represent said determined probabilities of said fuel price variable indicative of a prediction of a competitor's price change.

2. A method according to claim 1, wherein said third user interlace element comprises a graphical representation of said determined probabilities.

3. A method according to claim 2, wherein said graphical representation is a bar graph.

4. A method according to claim 1 wherein said set of fuel price values comprises a predetermined number of discrete values for said fuel price variable.

5. A method according to claim 4, further comprising selecting said predetermined number of discrete values for said fuel price variable, the selecting comprising:
    processing historical data indicating values of said fuel price variable; and
    selecting a predetermined number of values of said fuel price variable which occur most frequently in said historical data.

6. A method according to claim 1, wherein said set of fuel price values comprises a predetermined number of ranges of values for said fuel price variable.

7. A method according to claim 6, further comprising selecting said ranges of values for said fuel price variable, said selecting comprising:
    processing historical data indicating values of said fuel price variable; and
    defining a predetermined plurality of ranges of values of said fuel price variable.

8. A method according to claim 7, wherein said defining said predetermined plurality of ranges comprises defining a plurality of equally sized ranges containing a at least a subset of values of said fuel price variable between an upper value and a lower value.

9. A method according to claim 8, wherein said ranges together form a contiguous range between said upper value and said lower value.

10. A method according to claim 8, further comprising selecting said upper value and said lower value, said upper value and said lower value being selected so as to eliminate outlying values in said historical data.

11. A method according to claim 1, further comprising updating said first user interface element in response to said first user input, and updating said second user interlace element in response to said second user input.

12. A method according to claim 1, wherein each of said first and second user interlace elements presents discrete values for each of said first and second variables respectively.

13. A method according to claim 12, wherein receiving said first user input and said second user input comprises receiving selection of at least one discrete value presented by said first user interlace element, and said second user interlace element respectively.

14. A method according to claim 12, wherein receiving said first user input and said second user input comprises receiving selection of at least one range of values presented by said first user interface element, and said second user interface element respectively.

15. A method according to claim 1, wherein each of said first and second user interlace elements presents discrete ranges of values for each of said first and second variables respectively.

16. A method according to claim 1, wherein receiving at least one of said first user input and said second user input comprises:
receiving specification of a plurality of values for said variable, each of said values having an associated probability value.

17. A method according to claim 1, further comprising:
generating said fuel price variable value in response to both said first user input and said second user input.

18. A method according to claim 17, further comprising:
processing historical data comprising a plurality of data sets, each data set comprising values for said first and second input variables, and an associated value for said output variable;
wherein generating said fuel price value comprises:
selecting data sets using said first input data and said second input data; and
generating said output value using said selected data sets.

19. A method according to claim 17, wherein generating said fuel price value comprises using a Bayesian Belief Network (BBN).

20. A method according to claim 1, wherein said fuel price variable is a fuel price change variable.

21. A method according to claim 1, wherein said fuel price variable is a wholesale fuel price variable.

22. A data carrier carrying computer readable program code configured to cause a computer to carry out a method according to claim 1.

23. The method of claim 1 further including routing, in response to said determined probability, a predetermined fuel grade to a fuel tank and filling said fuel tank with said predetermined fuel grade.

24. Computer apparatus configured to display values for an output variable indicative of a prediction of a competitor's price change, the apparatus comprising:
a program memory storing processor readable instructions; and
a processor configured to read and execute instructions stored in said program memory;
wherein said program memory contains instructions configured controlling the processor to carry out the following functions:
displaying a first user interlace element configured to present values of a first input variable affecting said fuel price variable;
displaying a second user interlace element configured to present values of a second input variable affecting said fuel price variable;
displaying a third user interlace element configured to present values of the fuel price variable indicative of a prediction of a competitor's price change, said fuel price variable varying in dependence upon said first and second input variables;
receiving first user input of a value for said first variable via said first user interlace element;
receiving second user input of a value for said second variable via said second user interface element;
storing a set of values of said fuel price variable;
determining a probability for each of said values of said fuel price variable indicative of a prediction of a competitor's price change based upon values of said first and second input variables; and
updating said displayed third user interface element in response to said first user input and said second user input to represent said determined probabilities of said fuel price variable indicative of a prediction of a competitor's price change.

25. The apparatus of claim 24 wherein said program memory stores further instructions that when executed cause, in response to said determined probability, a predetermined fuel grade to be routed to a fuel tank and thereby fill said fuel tank.

26. Apparatus for displaying values for a fuel price variable indicative of a prediction of a competitor's price change, the apparatus comprising:
a display device; and
a processor configured to:
display a first user interface element configured to present values of a first input variable affecting said fuel price variable indicative of a prediction of a competitor's price change on said display device;
display a second user interlace element configured to present values of a second input variable affecting said fuel price variable on said display device;
display a third user interface element configured to present values of the fuel price variable on said display device, said fuel price variable varying in dependence upon said first and second input variables;
receive first user input of a value for said first variable via said first user interlace element;
receive second user input of a value for said second variable via said second user interface element;
store a set of values of said fuel price variable;
determine a probability for each of said values of said fuel price variable indicative of a prediction of a competitor's price change based upon values of said first and second input variables; and
update said displayed third user interlace element in response to said first user input and said second user input to represent said determined probabilities of said fuel price variable indicative of a prediction of a competitor's price change.

27. The apparatus of claim 26 wherein said processor is further configured to route, in response to said determined probability, a predetermined grade of fuel to a fuel tank to thereby fill said fuel tank with said predetermined grade of fuel.

* * * * *